(12) United States Patent
Hashimoto et al.

(10) Patent No.: US 10,509,568 B2
(45) Date of Patent: Dec. 17, 2019

(54) EFFICIENT SECURE BOOT CARRIED OUT IN INFORMATION PROCESSING APPARATUS

(71) Applicant: KABUSHIKI KAISHA TOSHIBA, Tokyo (JP)

(72) Inventors: Mikio Hashimoto, Tokyo (JP); Kentaro Umesawa, Kanagawa (JP); Yoshiyuki Amanuma, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 115 days.

(21) Appl. No.: 15/254,480

(22) Filed: Sep. 1, 2016

(65) Prior Publication Data

US 2017/0255384 A1    Sep. 7, 2017

(30) Foreign Application Priority Data

Mar. 1, 2016 (JP) .................... 2016-038991

(51) Int. Cl.
*G06F 3/06* (2006.01)
*G06F 9/4401* (2018.01)
(Continued)

(52) U.S. Cl.
CPC .............. *G06F 3/061* (2013.01); *G06F 3/062* (2013.01); *G06F 3/0637* (2013.01);
(Continued)

(58) Field of Classification Search
CPC .... G06F 9/4401; G06F 21/575; G06F 3/0673; G06F 3/0655; G06F 3/061; G06F 3/062;
(Continued)

(56) References Cited

U.S. PATENT DOCUMENTS 8,935,530 B2    1/2015  Hashimoto et al.
9,042,553 B2    5/2015  Hashimoto et al.
(Continued)

FOREIGN PATENT DOCUMENTS

EP       2339499 A1    6/2011
JP     2003216445 A    7/2003
(Continued)

OTHER PUBLICATIONS

William A. Arbaugh et al., "A Secure and Reliable Bootstrap Architecture", Security and Privacy, 1997 IEEE, pp. 65-71.
(Continued)

*Primary Examiner* — Hashem Farrokh
(74) *Attorney, Agent, or Firm* — Kim & Stewart LLP

(57) ABSTRACT

An information processing apparatus includes a nonvolatile memory, a flag settable to a first value indicating that a program stored in a memory region of the nonvolatile memory has not been verified, and to a second value indicating that the program has been verified, a switching circuit configured to set the flag to the first value, in response to a request for permission to modify the program stored in the memory region, and a verification circuit that sets the flag to the second value upon verification of the program stored in the memory region, and upon restart of the information processing apparatus, carries out a verification process of the program prior to execution of the program if the first value is set in the flag, and executes the program without the verification process if the second value is set in the flag.

18 Claims, 17 Drawing Sheets

(51) Int. Cl.
*G06F 21/57* (2013.01)
*G11C 14/00* (2006.01)
*G11C 16/34* (2006.01)
*G11C 16/22* (2006.01)

(52) U.S. Cl.
CPC .......... *G06F 3/0665* (2013.01); *G06F 3/0673* (2013.01); *G06F 9/4401* (2013.01); *G06F 21/575* (2013.01); *G11C 14/00* (2013.01); *G11C 16/3459* (2013.01); *G11C 16/22* (2013.01)

(58) Field of Classification Search
CPC ..... G06F 3/0637; G06F 3/0665; G11C 14/00; G11C 16/3459
USPC ......................................................... 711/156
See application file for complete search history.

(56) References Cited

U.S. PATENT DOCUMENTS

| | | | | |
|---|---|---|---|---|
| 2001/0056518 | A1* | 12/2001 | Maeda | G06F 13/4239 |
| | | | | 711/103 |
| 2004/0250057 | A1* | 12/2004 | Fujita | G06F 9/4406 |
| | | | | 713/1 |
| 2008/0260351 | A1 | 10/2008 | Li et al. | |
| 2009/0144559 | A1* | 6/2009 | Lee | G06F 21/575 |
| | | | | 713/189 |
| 2010/0191949 | A1* | 7/2010 | Shishido | G06F 21/575 |
| | | | | 713/2 |
| 2013/0091394 | A1* | 4/2013 | Kato | G06F 21/575 |
| | | | | 714/719 |
| 2013/0326219 | A1* | 12/2013 | Badam | G09C 1/00 |
| | | | | 713/168 |
| 2015/0244575 | A1* | 8/2015 | Abe | H04L 41/0846 |
| | | | | 709/217 |
| 2015/0261521 | A1* | 9/2015 | Choi | H04L 9/3247 |
| | | | | 713/176 |
| 2015/0370726 | A1 | 12/2015 | Hashimoto et al. | |
| 2015/0370727 | A1 | 12/2015 | Hashimoto et al. | |
| 2015/0370728 | A1 | 12/2015 | Yamada et al. | |
| 2016/0226843 | A1 | 8/2016 | Koike et al. | |
| 2017/0032126 | A1 | 2/2017 | Koike et al. | |
| 2017/0085383 | A1* | 3/2017 | Rao | H04L 9/3234 |

FOREIGN PATENT DOCUMENTS

| | | |
|---|---|---|
| JP | 2004-192529 A | 7/2004 |
| JP | 2009521048 A | 5/2009 |
| JP | 2012090231 A | 5/2012 |
| JP | 2013069053 A | 4/2013 |
| JP | 2016009884 A | 1/2016 |
| WO | 2009013831 A1 | 1/2009 |
| WO | 2010021269 A1 | 2/2010 |

OTHER PUBLICATIONS

Notice of Reasons for Refusal dated Jul. 9, 2019 in corresponding Japanese Patent Application No. 2018-136167 with machine English translation, 6 pages.

* cited by examiner

FIG. 2

| | (REWRITING CONTROL FLAG) | (VERIFICATION STATE FLAG) | |
|---|---|---|---|
| TIME | WRITE PROHIBITE | VERIFICATION | Pg |
| (1) | ○ | ○ | 1 |
| (2) | ○ | × | 1 |
| (3) | × | × | 1 |
| (4) | × | × | 1/2 |
| (5) | × | × | 2 |
| (6) | ○ | × | 2 |
| (7) | ○ | ○ | 2 |

Rows (2)-(3): REWRITING PERMISSION FUNCTION
Rows (5)-(6): VERIFICATION FUNCTION

Row (1): VERIFIED
Rows (3)-(6): REWRITING PERMITTED
Rows (2)-(6): UNVERIFIED
Row (7): VERIFIED

EFFICIENT SECURE BOOT CARRIED OUT IN INFORMATION PROCESSING APPARATUS

CROSS-REFERENCE TO RELATED APPLICATION

This application is based upon and claims the benefit of priority from Japanese Patent Application No. 2016-038991, filed Mar. 1, 2016, the entire contents of which are incorporated herein by reference.

FIELD

The present embodiment relates to an information processing apparatus and a method for operating the same.

BACKGROUND

An information processing apparatus such as a microcontroller performs predetermined operations according to a program that is loaded from data storage and executed. At this time, it is desirable to start the program properly and at a high speed.

DESCRIPTION OF THE DRAWINGS

FIG. 2 illustrates states of a program with respect to values of a rewriting control flag and a verification state flag in the embodiment.

DETAILED DESCRIPTION

Figure 1:
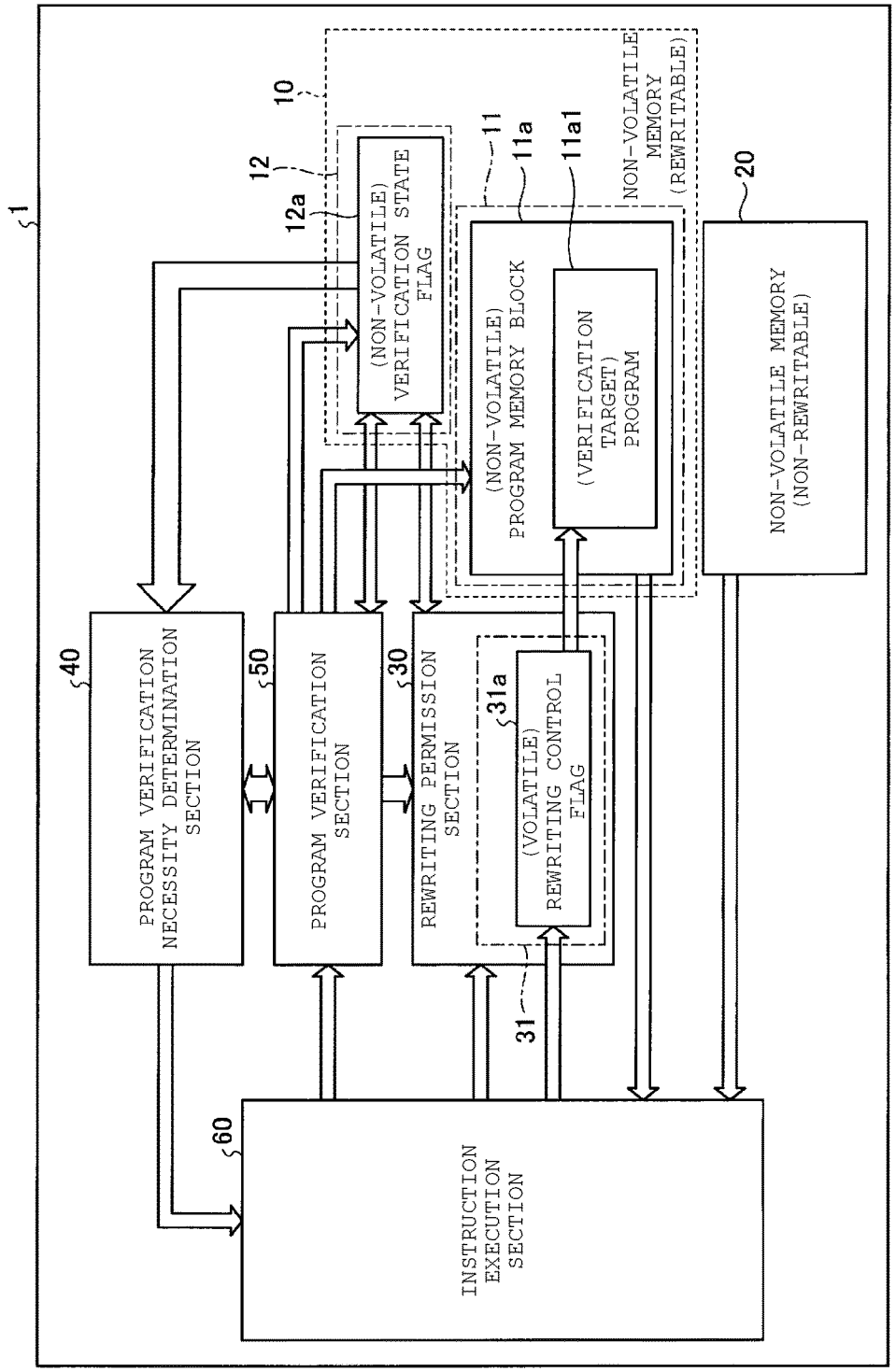
FIG. 1 is a block diagram of an information processing apparatus according to an embodiment.

An embodiment provides an information processing apparatus which is able to start a program properly and at a high speed.

According to an embodiment, an information processing apparatus includes a nonvolatile memory, a flag settable to a first value indicating that a program stored in a memory region of the nonvolatile memory has not been verified, and to a second value indicating that the program has been verified, a switching circuit configured to set the flag to the first value, in response to a request for permission to modify the program stored in the memory region, that is issued when the second value is set in the flag, and a verification circuit that sets the flag to the second value only upon verification of the program stored in the memory region, and upon restart of the information processing apparatus, carries out a verification process of the program if the first value is set in the flag, and executes the program without the verification process if the second value is set in the flag.

The information processing apparatus according to one or more embodiments will be described in detail with reference to the accompanying drawings. The present disclosure is not limited to the following embodiments.

Embodiment

A information processing apparatus according to an embodiment will be described below. The information processing apparatus can be applied to, for example, a controller (ECU) which electrically controls each unit of an automobile or a controller which controls each unit of sensor nodes (smart meters) which transmit observed values wirelessly. Since these controllers are required to be miniaturized and manufactured at low cost, the information processing apparatus is preferably implemented as a microcontroller (built-in microcomputer) formed by one chip. This information processing apparatus performs a predetermined operation in accordance with a system program. Further, the information processing apparatus can execute a secure boot in order to detect and prevent unauthorized modification of system program when the system program starts.

For example, various functions are performed using software, and these functions includes safety functions of equipment of which unintended operation might lead to serious disasters, such as social infrastructure or automobiles. In addition, computer systems may become a target of various cyber-attacks, and also a risk of more high-level attacks is increasing and the damage caused by these attacks, such as stopping power systems, is increasing. The secure boot is a basic cyber-attack countermeasure in which authenticity of a computer system is verified by confirming validity of a system program at the time of start-up.

On the other hand, since an information processing apparatus applied to an ECU, a sensor node, or the like is limited in terms of processing capacity in order to satisfy demands for miniaturization and reduced manufacturing costs, it is necessary to speed up the start-up process of the system program by limiting execution frequency of the secure boot to a minimum level. That is, in the information processing apparatus, it is desirable to start the system program properly and at a high speed.

For example, in a built-in microcomputer, eXecute In Place (XIP) system is employed, in which without loading contents of a non-volatile flash memory in a DRAM, processing of the contents of the non-volatile flash memory itself is carried out. In such a case, it is possible to start an application in flash memory immediately after start-up if the secure boot is not carried out. However, when the secure boot is performed, the reading of the program image and fingerprint calculation are carried out, which lead to delay of the start-up. In comparison with large scale high-speed processors mounted on personal computers, in built-in microcomputers, throughputs of the memory and the fingerprint calculation are low and thus cause longer delay. For that reason, regarding the built-in microcomputers, there is a stronger need to increase the speed of the start-up process of the system program by suppressing the execution frequency of the secure boot to a minimum level.

In the present embodiment, by performing the following procedure and appropriately controlling the execution frequency of the secure boot, the average start-up time of the program is shortened while unauthorized modification of the program (system program) is reliably detected and prevented.

FIG. 1 is a functional block diagram of an information processing apparatus 1. The information processing apparatus (microcontroller) can execute a secure boot. The information processing apparatus 1 includes a non-volatile memory 10, a non-volatile memory 20, a rewriting permission section 30, a program verification necessity determination section 40, a program verification section 50, and an instruction execution section 60. Functions related with the secure boot are performed by the rewriting permission section 30, the program verification necessity determination section 40, and the program verification section 50.

Here, each of the functions of the rewriting permission section 30, the program verification necessity determination section 40, the program verification section 50, and the instruction execution section 60 may be implemented by hardware (for example, as circuits) in the information processing apparatus 1, or may be implemented by software (for example, as function modules stored in the non-volatile memory 20 and read out as a batch or in sequence in accordance with progress of the processes). Alternatively, some of the functions may be implemented by hardware in the information processing apparatus 1 and the remaining functions may be implemented by software in the information processing apparatus 1.

The non-volatile memory 20 stores information in a non-volatile and non-rewritable manner. The non-volatile memory 20 is, for example, a mask ROM, and information is written therein during manufacturing thereof. A system program which serves as a platform for the information processing apparatus 1 is stored in the non-volatile memory 20 in advance (during the manufacture). The system program is read out from the non-volatile memory 20 and written in the instruction execution section 60 (for example, in byte units) when the information processing apparatus 1 is started up, or the like.

The non-volatile memory 10 stores information in a non-volatile and rewritable manner and is, for example, a flash memory. When the instruction execution section 60 accesses the non-volatile memory 10 in unit of byte, it is possible to use a NOR-type flash memory as the non-volatile memory 10. The non-volatile memory 10 includes a first non-volatile memory region 11 and a second non-volatile memory region 12.

The first non-volatile memory region 11 includes a program memory block 11a. The program memory block 11a stores a program 11a1 in a non-volatile manner. The program 11a1 is verified by the program verification section 50. The program 11a1 may be a updated functional portion of the system program, or may be an updated system program itself.

The second non-volatile memory region 12 stores a verification state flag (first flag) 12a in a non-volatile manner. The verification state flag 12a has a first value or a second value. The first value indicates that the program 11a1 has not been verified (referred to below as "unverified" or "x"). The second value indicates that the program 11a1 has been verified (referred to below as "verified" or "o"). The verification state flag 12a may be made redundant, and, for example, includes control bits which indicates unverified/verified and sign bits used for error correction of the control bits.

The rewriting permission section 30 permits or prohibits writing to the first non-volatile memory region 11. The rewriting permission section 30 includes a data storage unit 31. The data storage unit 31 stores a rewriting control flag (second flag) 31a in a volatile manner. The rewriting control flag 31a has a third value or a fourth value. The third value indicates that rewriting of the first non-volatile memory region 11 is prohibited (referred to below as "prohibited" or "o"). The fourth value indicates that rewriting of the first non-volatile memory region 11 is permitted (referred to below as "permitted" or "x").

The rewriting permission section 30 can prohibit writing to the first non-volatile memory region 11 by setting the value of the rewriting control flag 31a to the third value ("prohibited"), and can permit the writing to the first non-volatile memory region 11 by setting the value of the rewriting control flag 31a to the fourth value ("permitted").

For example, when a rewriting permission request is received from the instruction execution section 60 and the verification state flag 12a has the second value ("verified"), the rewriting permission section 30 changes the value of the verification state flag 12a from the second value ("verified") to the first value ("unverified"). The rewriting permission section 30 changes the rewriting control flag 31a from the third value ("prohibited") to the fourth value ("permitted") in accordance with the change of the verification state flag 12a to the first value ("unverified"). As a result, writing from the instruction execution section 60 to the first non-volatile memory region 11 is permitted.

The program verification necessity determination section 40 determines whether or not it is necessary to verify the program 11a1 based on the value of the verification state flag 12a at the time of start-up of the information processing apparatus 1 (for example, when a restarting process is performed). The program verification necessity determination section 40 determines that it is necessary to verify the program 11a1 when the verification state flag 12a has the first value ("unverified") at the time of start-up of the information processing apparatus 1. When the verification state flag 12a has the second value ("verified") at the time of start-up of the information processing apparatus 1, the program verification necessity determination section 40 determines that it is not necessary to verify the program 11a1 and sends a normal start-up permission notification to the instruction execution section 60.

The program verification section 50 can perform verification of the program 11a1. For example, when the verification request is received from the instruction execution section 60, the program verification section 50 controls the rewriting permission section 30 to change the rewriting control flag 31a from the fourth value ("permitted") to the third value ("prohibited"). Alternatively, when the verification of the program 11a1 is necessary, the program verification section 50 controls the rewriting permission section 30 to change the rewriting control flag 31a from the fourth value ("permitted") to the third value ("prohibited").

According to this control, the rewriting permission section 30 changes the rewriting control flag 31a from the fourth value ("permitted") to the third value ("prohibited"). As a result, writing from the instruction execution section 60 to the first non-volatile memory region 11 is prohibited. The program verification section 50 verifies the program 11a1 in accordance with these changes. When the verification is successful, the program verification section 50 changes the verification state flag 12a from the first value ("unverified") to the second value ("verified") and sends a verification success notification to the instruction execution section 60. When the verification fails, the program verification section 50 sends a verification failure notification to the instruction execution section 60 without changing the verification state flag 12a from the first value ("unverified").

Alternatively, when verification of the program 11a1 is not necessary, the program verification section 50 skips the verification of the program 11a1. At this time, the verification state flag 12a is set to the second value ("verified").

The instruction execution section 60 does not execute the program 11a1 if verification thereof failed, but does execute the program 11a1 if verification thereof was successful. The instruction execution section 60 can comprehensively control each unit according to the program 11a1. For example, when the instruction execution section 60 receives an update command for the program 11a1 from an external source (a higher level controller or the like), the instruction execution section 60 issues a rewrite permission request in accordance with the program 11a1 being executed and sends the rewrite permission request to the rewriting permission section 30. When it is determined that the instruction execution unit 60 should start-up the program 11a1 in accordance with a command from an external source or in accordance with an autonomous determination and no normal start-up permission notification is received within a predetermined time, the instruction execution section 60 issues a verification request in accordance with the program 11a1 being executed and sends the verification request to the program verification section 50. When the verification success notification is received, the instruction execution section 60 starts to execute the updated program 11a1 read out from the program memory block 11a. When the verification failure notification is received from the program verification section 50, the instruction execution section 60 stops execution of the program 11a1 (execution is not carried out even when the updated program 11a1 is read out from the program memory block 11a). In contrast, when it is determined that the instruction execution section 60 should start-up the program 11a1 in accordance with a command from an external source or in accordance with an autonomous determination and a normal start-up permission notification is received from the program verification necessity determination section 40 within the predetermined time, the instruction execution section 60 starts the execution of the updated program 11a1 read out from the program memory block 11a without issuing a verification request.

FIG. 2 illustrates states of the program 11a1 with respect to values of the rewriting control flag 31a and the verification state flag 12a. In the information processing apparatus 1, by referring to the non-volatile verification state flag 12a and the volatile rewriting control flag 31a, it is possible to determine whether or not the program 11a1 is in a safe state even without verifying the program 11a1. Specifically, according to the rewriting permission function of the rewriting permission section 30, in when the verification state flag 12a has the first value ("x"), the rewriting control flag 31a is changed from the third value ("o") to the fourth value ("x"). According to the verification function of the program verification section 50, in a state where the verification state flag 12a has the first value ("x"), the rewriting control flag 31a is changed from the fourth value ("x") to the third value ("o"). Further, the verification state flag 12a is changed to the second value ("o"), when the verification is successful. As a result, it is ensured that the rewriting control flag 31a has the third value ("o") when the verification state flag 12a has the second value ("o"). Since the verification state flag 12a is stored in a non-volatile manner in the second non-volatile memory region 12, this change of the flag value can be carried out even when the information processing apparatus 1 is restarted.

With reference to the flag values, when it is possible to expect that rewriting has not been performed with respect to the first non-volatile memory region 11 because the verification state flag 12a has the second value ("o") (that is, rewriting has not been performed with respect to the program 11a1), it is possible to skip execution of the secure boot. As a result, it is possible to suppress the execution frequency of the secure boot to the minimum level (only when the verification state flag 12a has the first value ("x")) and to speed up the start-up process of the program 11a1. Accordingly, it is possible to reliably detect and prevent unauthorized modification of the program 11a1 and to shorten the average start-up time of the program 11a1. In addition, since it is possible to suppress the execution frequency of the secure boot to the minimum level, it is possible to reduce average power consumption of the information processing apparatus 1.

Figure 3:
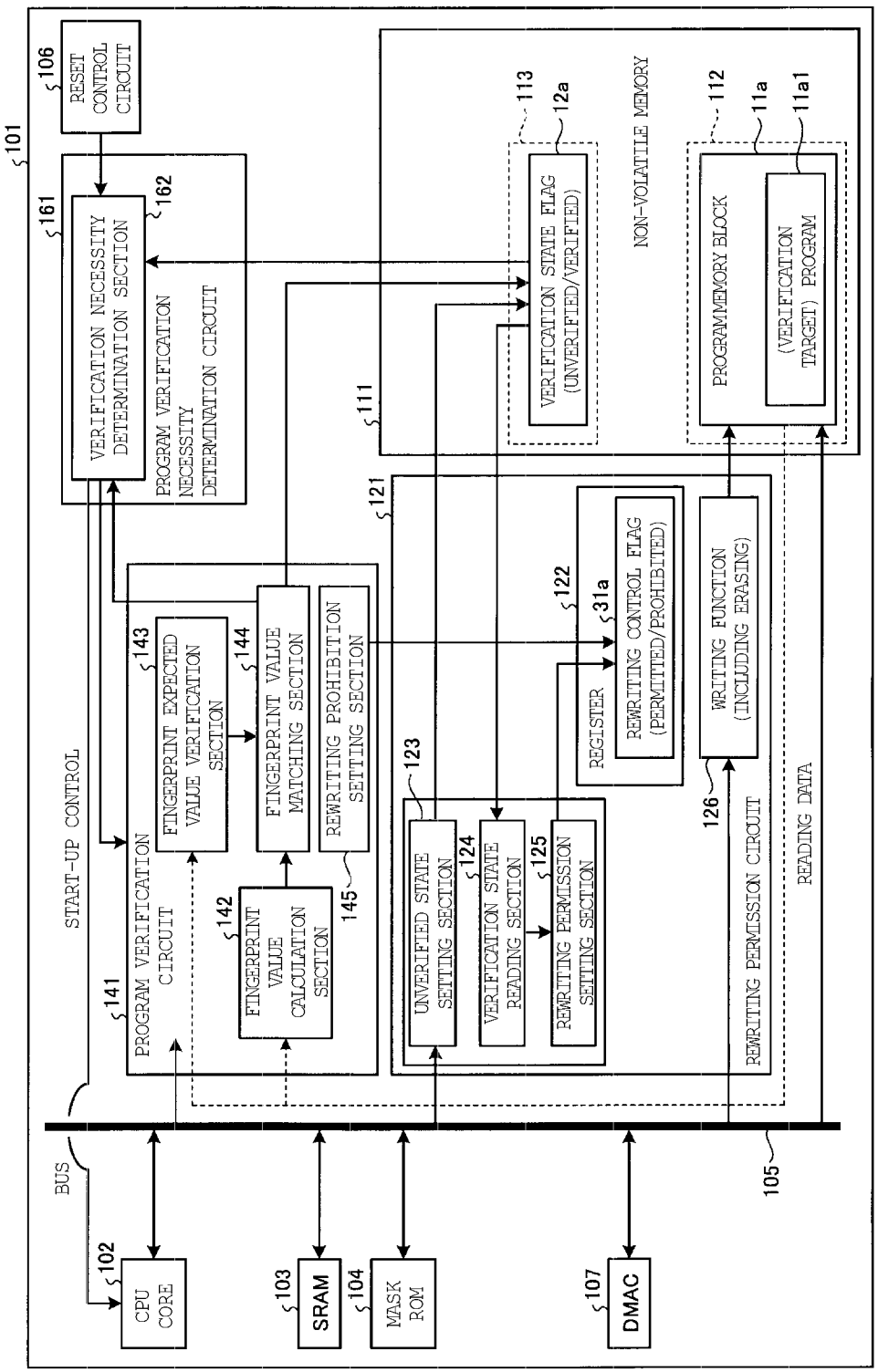
FIG. 3 is a block diagram which illustrates a hardware configuration of the information processing apparatus according to the embodiment.

FIG. 3 is a block diagram which illustrates the hardware configuration of the information processing apparatus 1. In FIG. 3, a microcontroller chip 101 corresponds to the information processing apparatus 1.

The microcontroller chip 101 includes a CPU core 102, an SRAM 103, a mask ROM 104, a bus 105, a non-volatile memory 111, a rewriting permission circuit 121, a program verification circuit 141, a program verification necessity determination circuit 161, and a reset control circuit 106. The CPU core 102, the SRAM 103, the mask ROM 104, the non-volatile memory 111, the rewriting permission circuit 121, the program verification circuit 141, and the program verification necessity determination circuit 161 are connected to each other via the bus 105.

The CPU core 102 and the SRAM 103 correspond to the instruction execution section 60 of the information processing apparatus 1 in FIG. 1. The mask ROM 104 corresponds to the non-rewritable non-volatile memory 20. The non-volatile memory 111 corresponds to the rewritable non-volatile memory 10. The rewriting permission circuit 121 corresponds to the rewriting permission section 30. The program verification circuit 141 corresponds to the program verification section 50. The program verification necessity determination circuit 161 corresponds to the program verification necessity determination section 40.

The SRAM 103 includes a work region for the CPU core 102. For example, the CPU core 102 is able to read out a system program stored in the mask ROM 104, load the system program in the SRAM 103 in unit of word and execute the system program.

The non-volatile memory 111 includes a plurality of logical blocks. The plurality of logical blocks includes logic blocks 112 and 113. The logic block 112 corresponds to the first non-volatile memory region 11. That is, the logic block 112 includes the program memory block 11a. The program 11a1 is stored in the program memory block 11a in a non-volatile manner. The logic block 113 corresponds to the second non-volatile memory region 12. That is, the logic block 113 stores the verification state flag 12a in a non-volatile manner.

The non-volatile memory 111 is connected to the bus 105. However, among the plurality of logical blocks of the non-volatile memory 111, a region which is directly accessible from the CPU core 102 via the bus 105 is limited to the logic block 112 and the program 11a1 is stored therein as the system program. The verification state flag 12a is indirectly referred to and updated via the rewriting permission circuit 121, the program verification circuit 141, and the program verification necessity determination circuit 161, and it is not possible for the program to directly manipulate the value. The reset control circuit 106 is connected to the program verification necessity determination circuit 161.

The rewriting permission circuit 121 includes a register 122, an unverified state setting section 123, a verification state reading section 124, a rewriting permission setting section 125, and a writing section 126. The register 122 corresponds to the data storage unit 31. In accordance with control of the CPU core 102, the writing section 126 rewrites the information such as the program with respect to the program memory block 11a and erases information stored in the program memory block 11a when the rewriting control flag 31a has the fourth value ("permitted"). The program verification circuit 141 has a fingerprint value calculation section 142, a fingerprint expected value verification section 143, a fingerprint value matching section 144, and a rewriting prohibition setting section 145. The program verification necessity determination circuit 161 has a verification necessity determination section 162.

There are two major threats against which a secure boot is carried out by the microcontroller chip 101. One threat is external attacks (physical attacks) in which an off-chip memory connected to the microcontroller chip 101 is modified externally through an external bus or an external memory chip. This threat would not be an issue in on-chip memory controllers. Another threat is internal attacks in which a malware program which comes from outside while the system is running uses a memory rewriting function which is provided for proper program updates to rewrite the system program. Side channel attacks such as fault injection are not considered in the present embodiment.

As to the microcontroller chip 101 which has an on-chip memory (non-volatile memory 111), there is an advantage in that external attacks is less likely to occur because of the configuration. That is, when the microcontroller chip 101 is formed with a system-on-chip, the microcontroller chip 101 can be configured to not have an external terminal that allows direct access to the non-volatile memory 111. Although omitted from the drawings, to write the initial program, the microcontroller chip 101 may have a write terminal for the non-volatile memory, such as a JTAG terminal, before shipment from the factory. After writing the initial program, the JTAG terminal described above is disabled in the factory and then shipped. As a result, after the shipment, it is not possible to write the program through the JTAG terminal. Subsequent program updates are performed by writing a program acquired via a network from the CPU core 102 according to operation of the initial program written therein, into the non-volatile memory 111.

In the present embodiment, a configuration of the microcontroller chip 101 which can shorten the start-up time with little addition or modification of hardware configuration while securing the safety of the chip by the secure boot, by considering the advantage of being able to limit the attacks to internal attacks. The main requirements for the microcontroller chip 101 are as follows.

Requirement 1: As long as fingerprint verification of the system program (program 11a1) is performed once, by holding the "verified" verification state flag 12a in the non-volatile memory 111 of the microcontroller chip 101 (if the verification is successful), high-speed start-up is possible without performing fingerprint verification for the following start-up, excluding the cases below.

Requirement 2: The verification state is maintained and the speeding up effect is maintained even when a power shutdown occurs.

Requirement 3: However, when the system program (program 11a1) is rewritten, verification is performed at the time of restart. Then, when the verification is successful, the "verified" verification state flag 12a is maintained. In the next start-up, if there is no rewriting of the system program, high-speed start-up is possible without performing the fingerprint verification.

Requirement 4: In detection of the rewrite of the system program (program 11a1) at the time of the next start-up, it is possible to detect rewriting performed in accordance with arbitrary programs which include malicious programs without being limited to rewriting by the regular procedure. Regardless of whether or not rewriting has been actually performed, it is possible to detect a variety of cases that are likely to indicate that rewriting has been performed, such as cases where rewriting has been interrupted due to a power shutdown during the rewriting.

Requirement 5: The hardware size is small. For example, saving all logs of data writing to the program memory block 11a in a secure memory is not preferable, because the cost to prepare the secure memory for the saving and the increase in the power consumption are large.

Requirement 6: Since the writing of the update program to the non-volatile memory 111 depends on the distribution method of the update program, the writing of the update program is performed in accordance with the system program. Since the system program is executed to perform complicated functions including management of the network communication and received update program fragments, the system program has potential vulnerabilities to attacks. That is, attacks may come from the network, by executing malware programs, and the above or other malware programs may be written to the flash memory; however, even in that case, it is possible to eliminate the malware programs by performing verification and restart.

In order to clear Requirements 1 to 6, hardware logic is mounted on the microcontroller chip 101 to ensures that, even when power shutdown occurs, the non-volatile memory 111 has never become a rewritable state after the verification by the hardware engine (program verification circuit 141).

Figure 4:
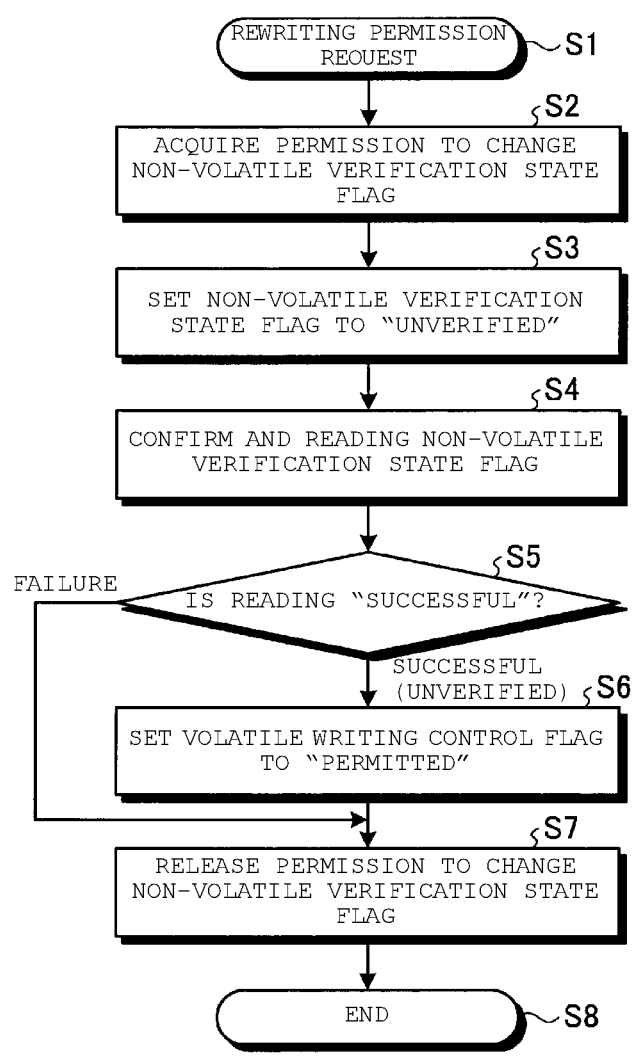
FIG. 4 is a flow chart which illustrates operations carried out by the information processing apparatus in accordance with a rewriting permission request.

FIG. 4 is a flowchart which illustrates operations carried out by the information processing apparatus 1 (microcontroller chip 101) in accordance with a rewriting permission request.

The rewriting permission circuit 121 sets the third value ("prohibited") as the default value in the rewriting control flag 31a when the microcontroller chip 101 is started. The system program (program 11a1) is executed to send a rewriting permission request issued by the CPU core 102 to the rewriting permission circuit 121 before data writing to the program memory block 11a (S1). The rewriting permission circuit 121 acquires a permission to change the verification state flag 12a in the non-volatile memory 111 (S2). Then, the rewriting permission circuit 121 sets the first value ("unverified") as the verification state flag 12a (S3). The rewriting permission circuit 121 reads out the value of the verification state flag 12a from the non-volatile memory 111 in order to confirm that the value of the verification state flag 12a has been appropriately written (S4). At this time, if sign bits are included in the read information, error correction may be performed. When the value of the read verification state flag 12a is the second value ("unverified") (S5, "success"), the rewriting permission circuit 121 sets the fourth value ("permitted") as the rewriting control flag 31a (S6). Then, the rewriting permission circuit 121 releases the permission to change the verification state flag 12a (S7). For example, by defining the second value ("unverified") of the verification state flag 12a and the fourth value ("permitted") of the rewriting control flag 31a as a same value, the operation of S6 can be carried out more simply just by copying the value of the read verification state flag 12a to the rewriting control flag 31a. Here, when the value of the verification state flag 12a cannot be properly read out (read-out error) such as error correction failure ("failure" in S5), the rewriting permission circuit 121 releases the permission to change the verification state flag 12a (S7) without performing the rewriting permission setting (S6).

According to these operations, the process corresponding to the rewriting permission request is completed (S8). Through this process, the fourth value ("permitted") is set as the rewriting control flag 31a, which enables writing to the program memory block 11a. Since the fourth value ("permitted") can be set as the rewriting control flag 31a only through the above process in accordance with the rewriting permission request, when the rewriting control flag 31a has the fourth value ("permitted"), it is ensured that the verification state flag 12a has the first value ("unverified"). If the restarting process of the microcontroller chip 101 is performed at this point, the verification process is performed at the next restart.

Furthermore, in addition to the normal procedure described above, the unverified state, i.e., a state where the verification state flag 12a has the first value ("unverified") is ensured when in the rewriting permission state, i.e., a state where the rewriting control flag 31a has the fourth value ("permitted"), even when there is an interruption due to a power shutdown or a failure to change the verification state flag 12a at any point in the procedure. In the present embodiment, instead of storing writing history of the program memory block 11a, the verification state flag 12a is set to the first value ("unverified") as pre-processing when the rewriting control flag 31a is set to the fourth value ("permitted"). As a result, in a state where the verification state flag 12a has the second value ("verified"), it is possible to ensure that the writing to the program memory block 11a has not been performed at all since the previous verification.

Figure 5:
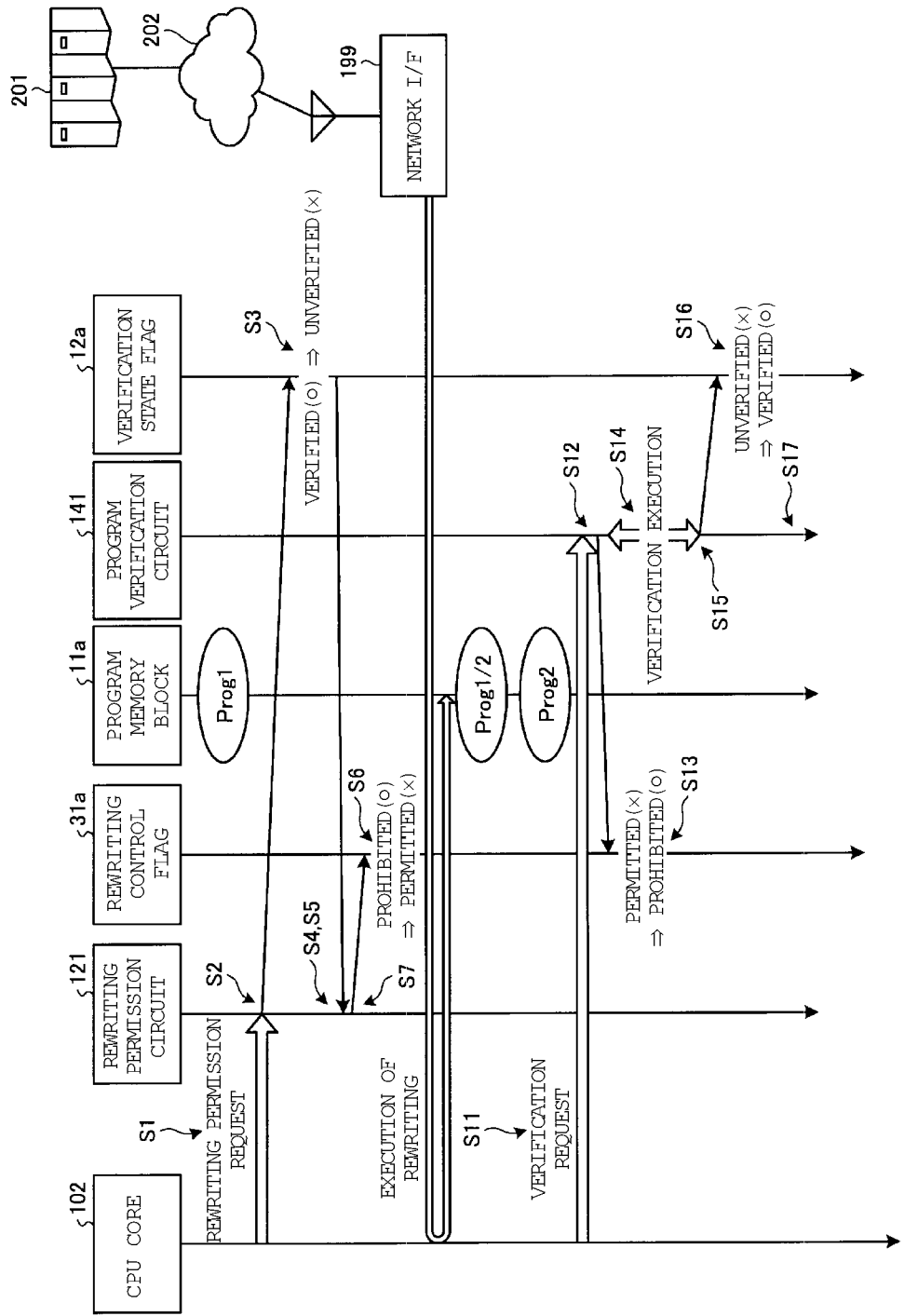
FIG. 5 is a sequence diagram which illustrates the operations carried out by the information processing apparatus according to the embodiment.

FIG. 5 is a sequence diagram which illustrates operations of the information processing apparatus 1 (microcontroller chip 101), and processes corresponding to the flow chart of FIG. 4 are shown with the same numbers. When the writing to the program memory block 11a is permitted, the CPU core 102 sequentially acquires an updated program image from an external server 201 via a network 202 and a network interface 199 in accordance with the system program ("Prog 1" as the program 11a1) and writes the updated program image to the program memory block 11a. At this time, the writing may be performed in any order. When the updated program image (for example, "Prog 2") is acquired via the network 202, the packet order or the like may be reversed. However, in the present embodiment, as long as the correct program image is written at the start of the verification described below, the writing may be performed in the program memory block 11a in any order before the start of the verification. Even when the received updated program is a malware program, the updated program can be detected by the verification process described below. Furthermore, even when the update process is taken over by a malware program which is transmitted via the network 202 and the malware program is written to the program memory block 11a, the malware program is detected through the verification process and it is possible to prevent the execution of the malware program in the program memory block 11a at the time of the next restart.

The CPU core 102 rewrites "Prog 1" to "Prog 2" in the program memory block 11a. In the program memory block 11a, the state changes from a state where the "Prog 1" is stored to a state where "Prog 2" is stored, via a state (Prog 1/2) where "Prog 1" and "Prog 2" are both stored. When the rewriting from the "Prog 1" to the "Prog 2" is completed, the CPU core 102 issues a verification request for the "Prog 2" after the rewriting.

Figure 6:
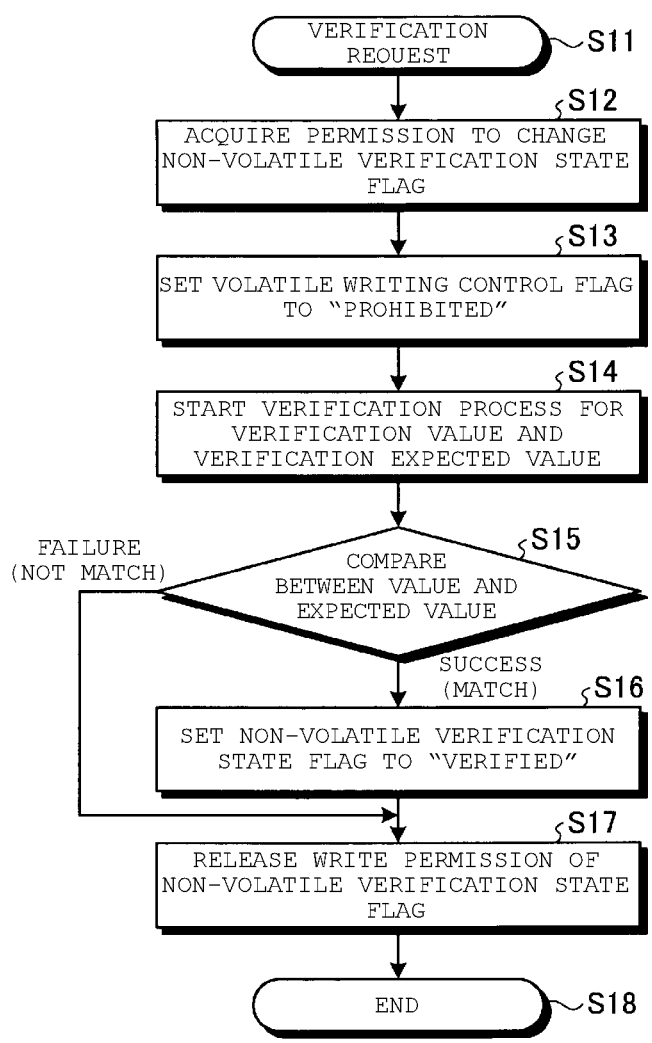
FIG. 6 is a flow chart which illustrates operations carried out by the information processing apparatus in accordance with a verification request.

FIG. 6 is a flowchart which illustrates operations carried out by the information processing apparatus 1 in accordance with a verification request. The program verification circuit 141 receives the verification request from the CPU core 102 (S11) and verifies contents of the program memory block 11a. Below, description will be given of a verification based on a public key signature, but the verification is also possible using a Message Authentication Code (MAC) or the like based on a common key.

The verification target program "Prog 2" and the public key signature "Cert" thereof are stored in the program memory block 11a. The signature "Cert" is a hash value of the verification target program with signature using a secret key "Ks" maintained by a program distributor. The program verification circuit has a public key "Kp" corresponding to Ks.

The program verification circuit 141 which received the verification request acquires a permission to set the verification state flag 12a (S12) and sets the rewriting control flag 31a to the third value ("prohibited") using the rewriting prohibition setting section 145 (S13).

Next, the fingerprint value calculation section 142 of the program verification circuit 141 calculates a fingerprint value of the verification target program "Prog 2", and the fingerprint expected value verification section 143 acquires a fingerprint expected value (S14). That is, the fingerprint expected value verification section 143 performs a first verification process (for example, signature verification), and acquires the fingerprint expected value when the first verification process is successful and cannot acquire the fingerprint expected value when the first verification process fails. When the first verification process is successful, the program verification circuit 141 performs a second verification process (for example, a fingerprint verification). That is, the fingerprint value matching section 144 of the program verification circuit 141 compares the fingerprint value and the fingerprint expected value (verification expected value). Here, the hash value of the program corresponds to the fingerprint value, and the hash value extracted from the public key signature corresponds to the fingerprint expected value. When the first verification process fails, the program verification circuit 141 does not perform the second verification process.

When the fingerprint value and the fingerprint expected value do not match ("failure" in S15), the verification fails and the program verification circuit 141 releases the permission to set the verification state flag 12a (S17) and the verification process is completed (S18).

When the fingerprint value and the fingerprint expected value match ("success" in S15), the verification is successful and the verification state flag 12a is set to the second value ("verified") by the fingerprint value matching section 144 (S16). The program verification circuit 141 releases the permission to set the verification state flag 12a (S17) and completes the verification (S18).

Figure 7:
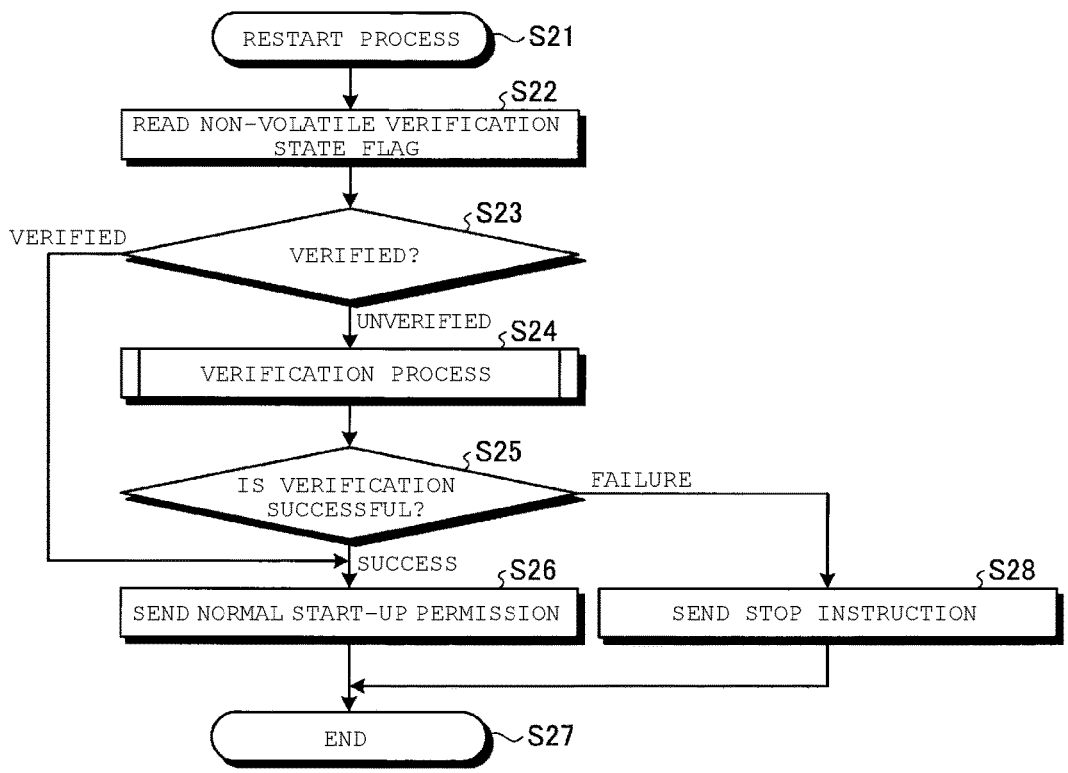
FIG. 7 is a flow chart which illustrates operations for a restarting process that is carried out by the information processing apparatus according to the embodiment.

FIG. 7 is a flow chart which illustrates operations of the information processing apparatus 1 when the restarting process is performed in a state where the verification state flag 12a is set to the second value ("verified").

Figure 8:
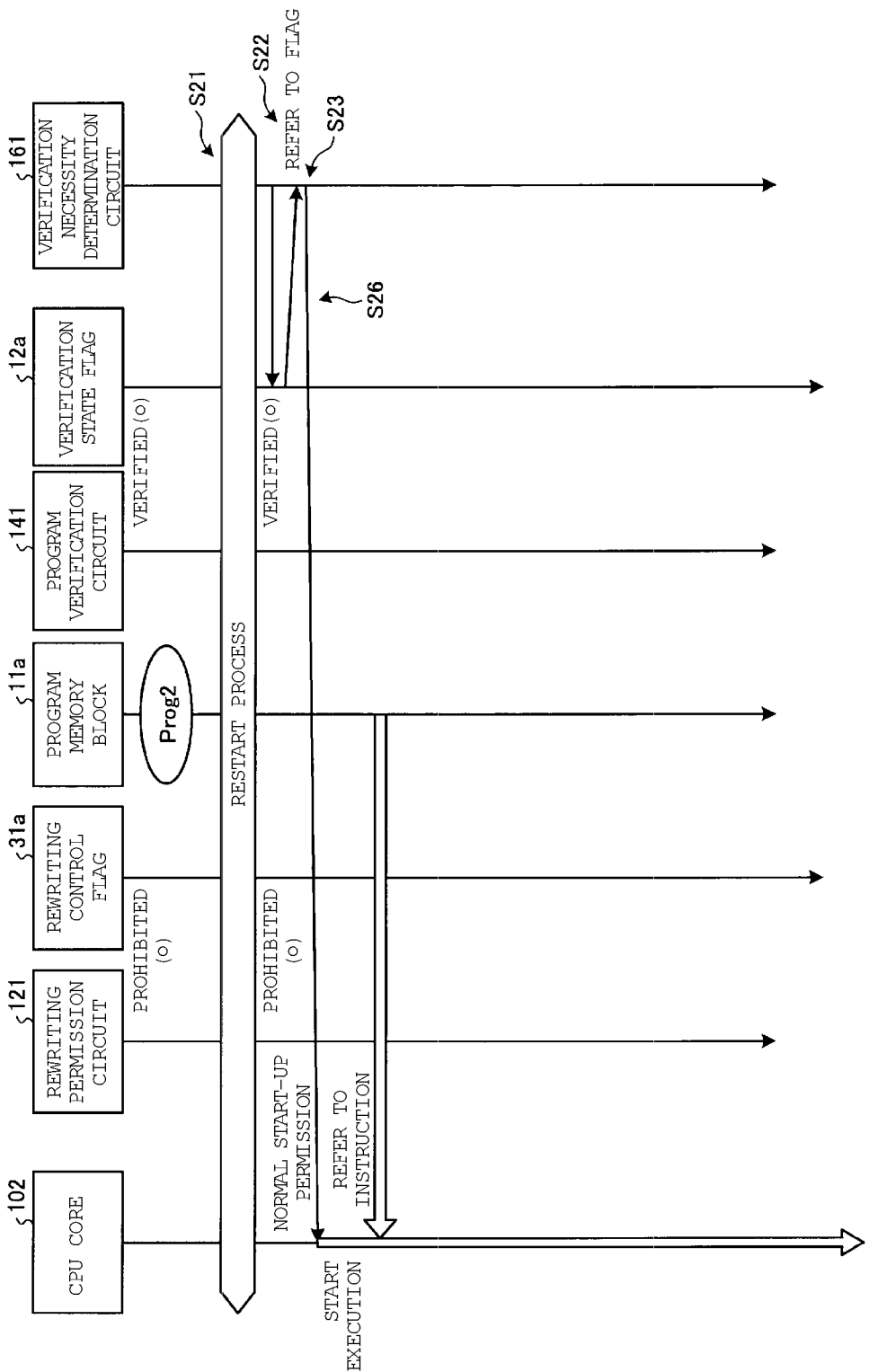
FIGS. 8-12 are a sequence diagram which illustrates operations carried out by the information processing apparatus according to the embodiment.

After a restarting process of the microcontroller chip 101 (S21) is performed, the program verification necessity determination circuit 161 receives a start-up signal from the reset control circuit 106 and reads out the value of the verification state flag 12a from the non-volatile memory 111 using the start-up signal as a trigger (S22). Since the value of the verification state flag 12a is the second value ("verified") ("verified" in S23), the program verification necessity determination circuit 161 determines that execution of the verification is not necessary and sends a normal start-up permission to the CPU core 102 (S26). In response thereto, the CPU core 102 executes the stored program 11a1 from a predetermined address. FIG. 8 is a sequence diagram which illustrates the operation of the information processing apparatus 1, and processes corresponding to the flow chart in FIG. 7 are shown by the same step numbers.

According to the method of the present embodiment, by combining the operations of the rewriting control flag 31a and the verification state flag 12a in the rewriting permission and the verification process, even when the verification is interrupted due to a power shutdown or the like, it is possible to perform the verification after the restarting process.

Figure 9:
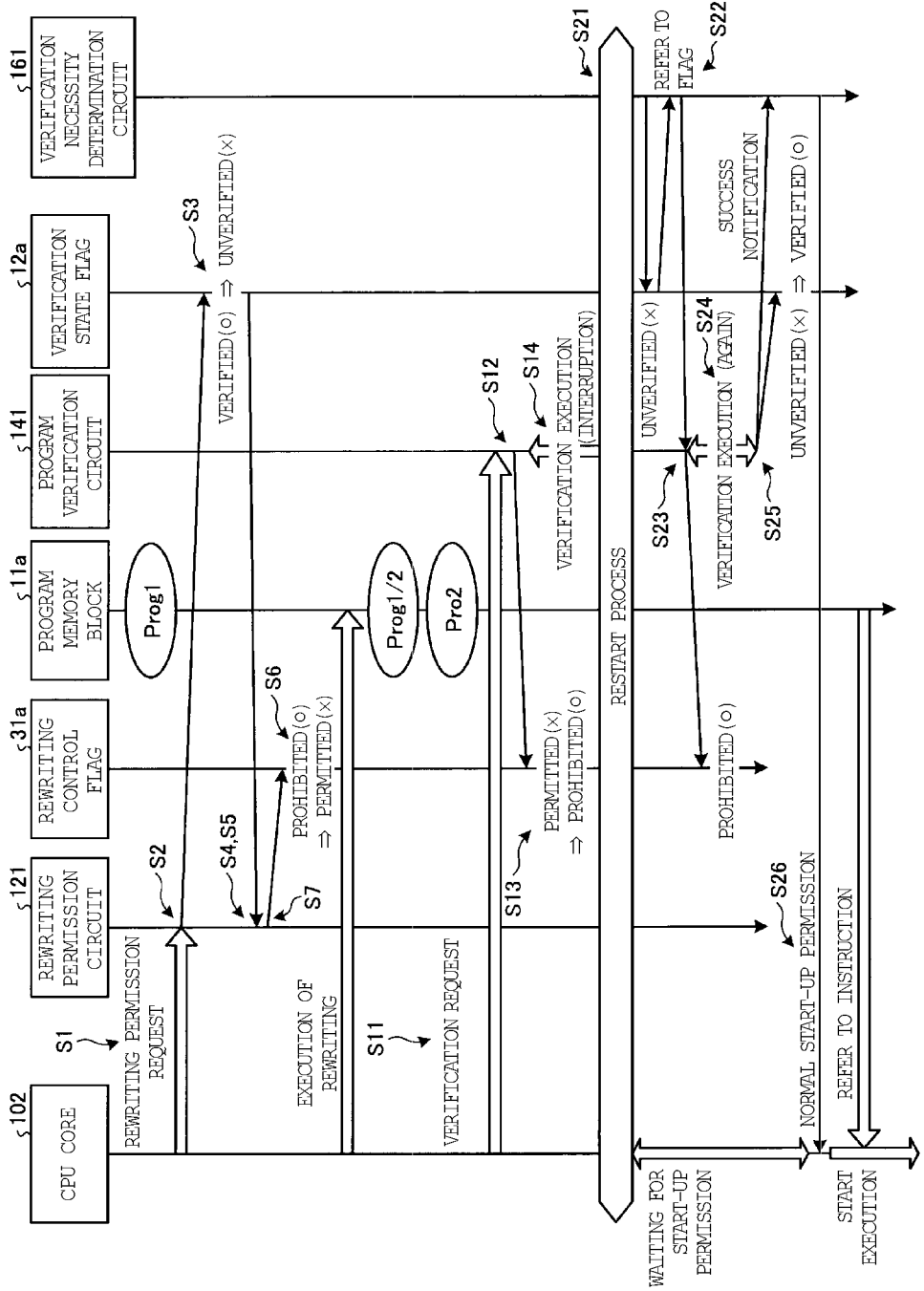

The operation at this time will be described with reference to FIG. 7 and FIG. 9. FIG. 9 is a sequence diagram which illustrates operations of the information processing apparatus 1. Up to the verification, the sequence is the same as in FIG. 5. The restarting process (S21) is carried out in a state where the verification calculation is incomplete or a state where the value which illustrates the verification state based on the verification calculation is not set as the verification state flag 12a.

In the restarting process, the verification state flag 12a is set to the first value ("unverified"). The program verification necessity determination circuit 161 determines that the verification is necessary according to the verification state flag 12a being the first value ("unverified") ("unverified" in S23), and requests execution of the verification to the program verification circuit 141. The program verification circuit 141 changes the rewriting control flag 31a to the third value ("prohibited") and performs verification (S24). Here, since the correct update program is written to the program memory block 11a, the program verification circuit 141 carries out the verification successfully ("success" in S25), sets the verification state flag 12a to the second value ("verified"), and sends a notification of the verification success to the program verification necessity determination circuit 161. Then, the program verification necessity determination circuit 161 sends a notification of the normal start-up permission to the CPU core 102 (S26), and the updated program 11a1 is executed (S27).

In this manner, even when the verification operation is interrupted, it is possible to perform the verification after the restarting process. However, since the verification is performed after the restarting process, the start-up time of the program 11a1 becomes longer.

Figure 10:
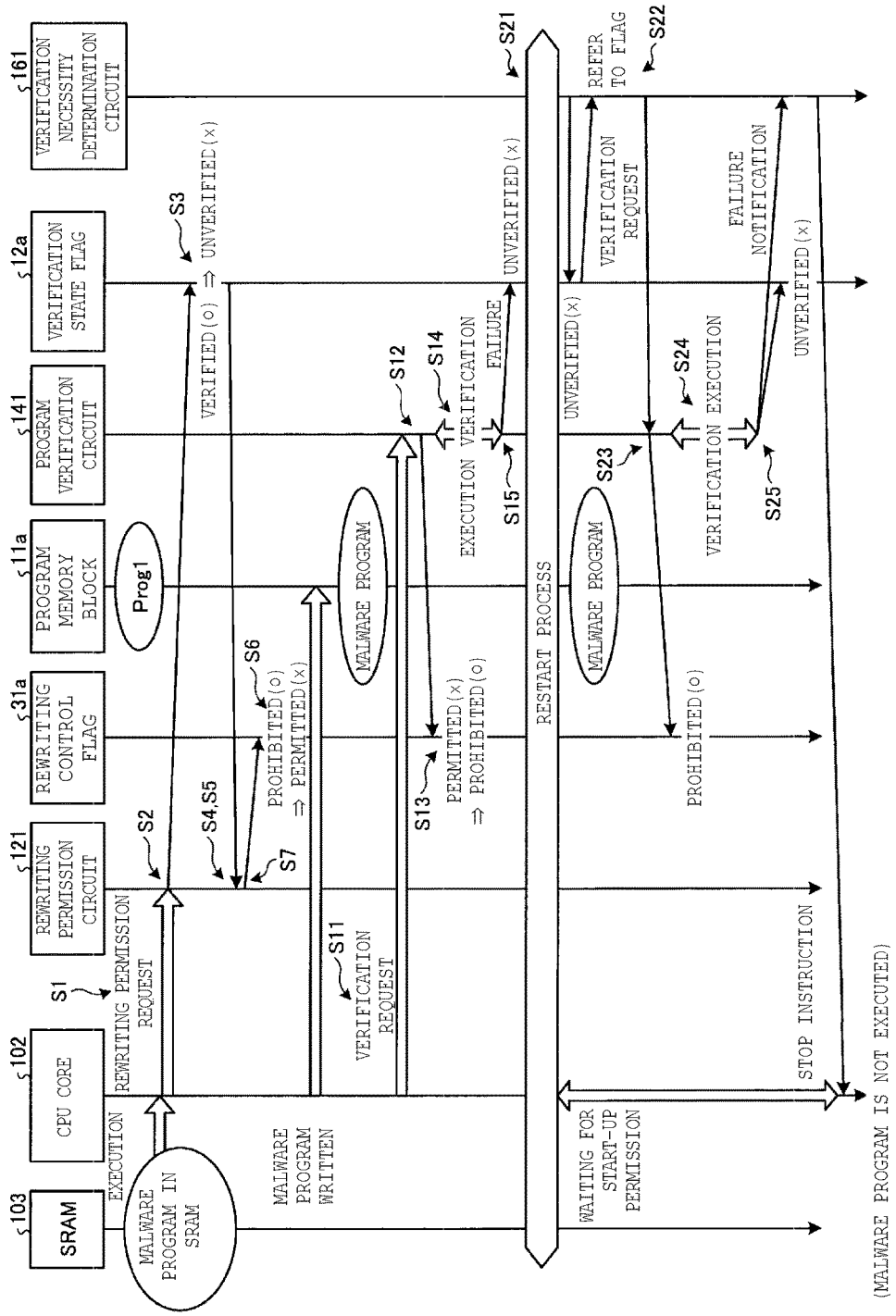

Next, operations carried out when an irregularity is detected will be described. FIG. 10 is a sequence diagram of a case where a malware program which infiltrates in the SRAM 103 attempts to write the malware program to the program memory block 11a by, using the vulnerability of the system program. FIG. 10 illustrates an example where when the malware program spontaneously issues a verification process, the verification is performed again at the time of the restarting process and a malware program is not started.

The malware program in the SRAM 103 issues a rewriting permission request which is the same as the one issued by the regular program, performs writing to the program memory block 11a, and issues a verification request. The difference is that the malware program is written instead of the regular program. Even in this case, the verification process (S14) is executed, but the verification fails ("failure" in S15) and the verification state flag 12a remains as the first value ("unverified") even after the verification is completed.

The malware program continues to be executed until the restarting process (S21); however, after the restarting process, since the verification state flag 12a is the first value ("unverified") ("unverified" in S23), the verification process (S24) is executed. At this time, since the verification result becomes failure ("failure" in S25), a stop instruction is issued to the CPU core 102 (S28). Accordingly, the malware program is not executed (S27). Also, the malware program in the SRAM 103 disappears if the power is shut down.

Here, the malware program stored in the SRAM 103 and the malware program written to the program memory block 11a may not necessarily be the same.

Figure 11:
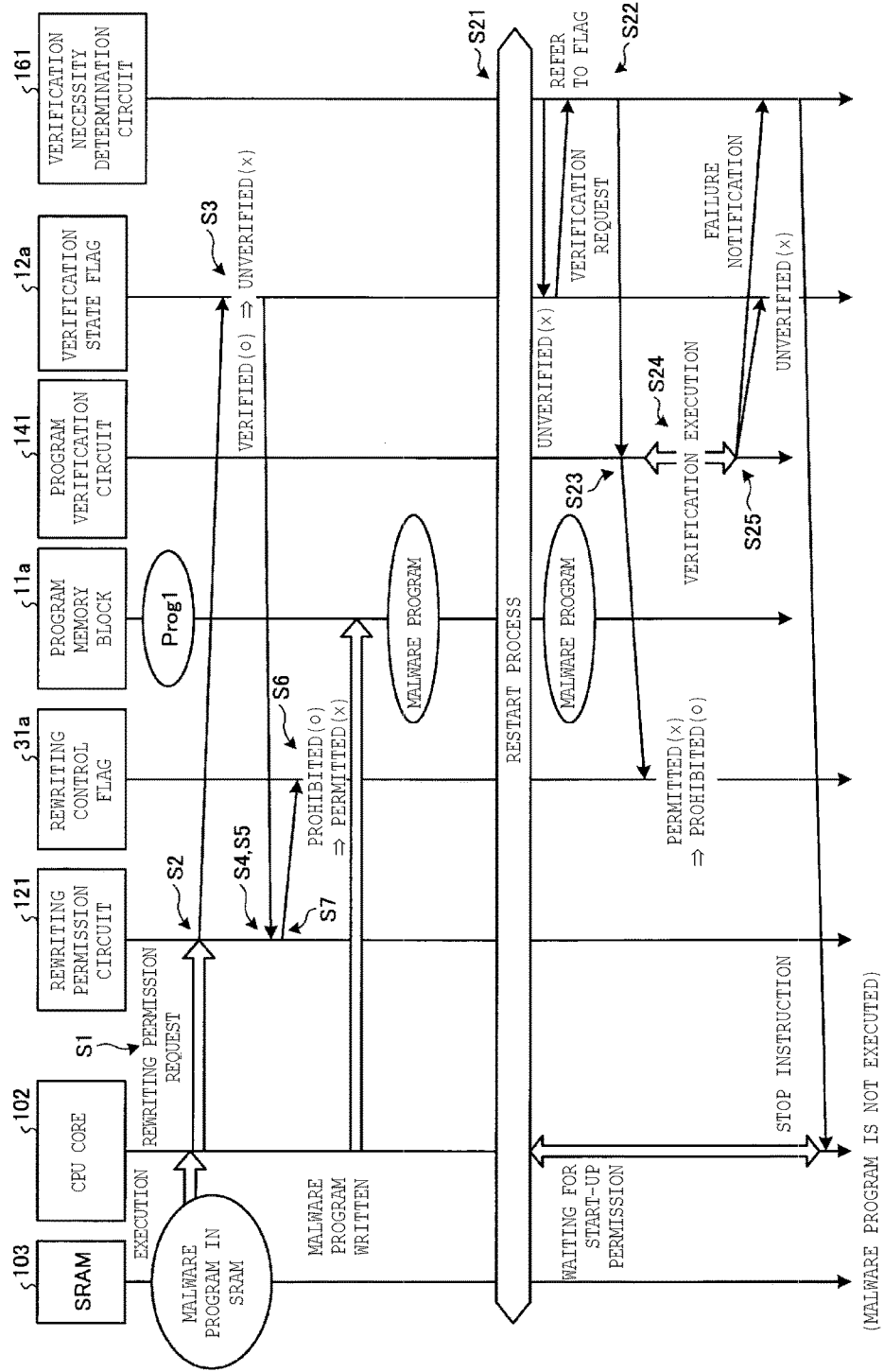

FIG. 11 illustrates a sequence when the verification request is not issued after the malware program is written to the program memory block 11a. Since the verification request is not issued, the verification state flag 12a remains as the first value ("unverified"). Also, since the verification fails at the restart in the same manner as in the case of FIG. 5, the malware program is not executed.

Figure 12:
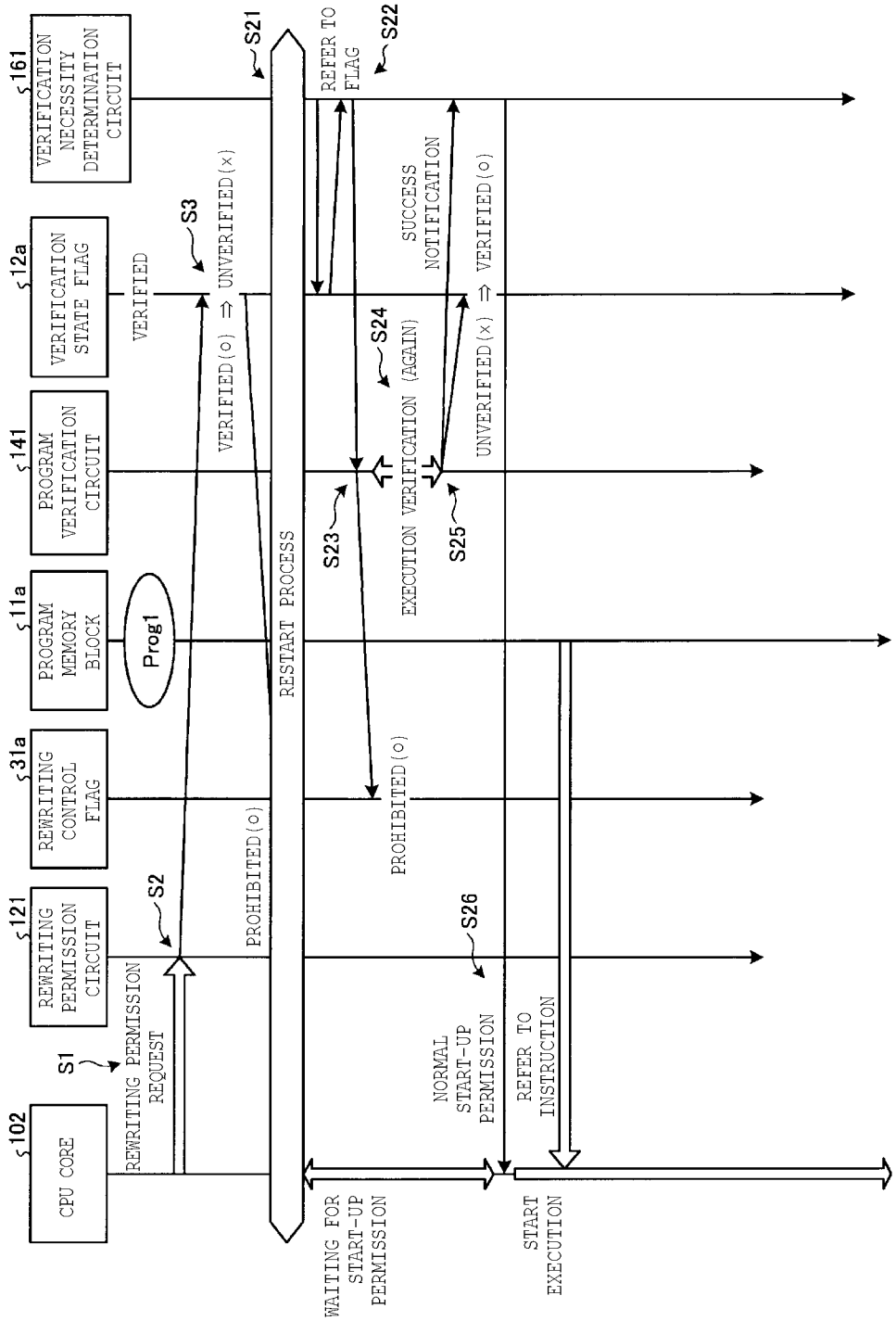

FIG. 12 illustrates a sequence when a process interruption occurs and a restarting process is carried out due to a power shutdown or the like in the middle of the process in accordance with a rewriting permission request.

After the issuing of the rewriting permission request using the CPU core 102, the verification state flag 12a is reset to the first value ("unverified"), but the process is interrupted and restarted due to a power shutdown before the result is reflected in the rewriting control flag 31a. Since the rewriting control flag 31a is maintained as the third value ("prohibited") before the power shutdown, no writing is performed with respect to the program memory block 11a by any component including a DMAC 107 or the like other than the CPU core 102.

After the restarting process (S21), since the verification state flag 12a is set to the first value ("unverified"), the verification is performed again (S24); however, since the program memory block 11a is not rewritten, the verification is successfully carried out ("success" in S25), a notification of the normal start-up permission is sent to the CPU core 102 (S26), and the program 11a1 is executed.

Here, in the rewriting permission operation, it is assumed that the order of the two state flag operations is switched with each other. In such a case, when a rewriting permission request is issued by the CPU core 102, after setting the rewriting control flag 31a to the fourth value ("permitted"), the verification state flag 12a is set to the first value ("unverified").

At this time, writing becomes possible to the program memory block 11a immediately after the rewriting control flag 31a is set to the fourth value ("permitted"). Then, when the restart is carried out before completion of setting of the first value ("unverified") to the non-volatile verification state flag 12a, the verification after the restarting process is skipped regardless of the rewriting of the program memory block 11a being generated, because the verification state flag 12a is the second value ("verified"). When the malware program is written during the writing, the malware program is executed successfully.

On the other hand, since the power shutdown occurs after changing of the verification state flag 12a in FIG. 12, the verification is performed after the restarting process. When the power shutdown occurs before changing of the verification state flag 12a, the verification after the restart is not performed because the verification state flag 12a remains as the second value ("verified"). At this time, since the setting of the rewriting control flag 31a is performed after setting of the verification state flag 12a, it is ensured that the writing to the program memory block 11a is not performed. Since it is possible to eliminate the possibility that the verified program 11a1 is rewritten even if the verification is not performed after the restarting process, the setting process is safe.

That is, according to the present embodiment, with the verification state flag 12a which indicates the verification state and the rewriting control flag 31a which is used to control the writing to the non-volatile memory, it is possible to safely perform the verification state management which includes an asynchronous power shutdown. In addition, according to the present embodiment, since little increase in the circuit components is needed with respect to the existing microcontroller chips, the information processing apparatus 1 of the present embodiment is suitable for equipment that requires both low manufacturing cost and security, such as field devices and sensor devices to be located outdoors.

In the present embodiment, it is expected that the system program will issue the writing permission request and the verification request individually. The reason for this is because the information processing apparatus 1 is assumed to have the memory configuration of the built-in controller that performs the rewriting procedure. In addition to this procedure, a configuration for integrating and carrying out the writing permission request, the writing, and the verification request as a hardware process may also be logically possible, but this configuration is not suitable for the built-in microcontroller. In the case of this procedure, before data writing to the writing destination of the program memory becomes ready, it is necessary to store all portions of the program 11a1, which is the verification target, in a separate buffer memory. As a buffer memory, the most common is the SRAM, but since the SRAM has a higher cost per bit than flash memory, in general, the capacity is smaller than the flash memory. Accordingly, there is a need to divide and perform the writing and verification of the flash memory into a plurality of times. This complicates the verification function on the hardware side.

For example, even when the update program is transmitted in a divided manner, divided portions of the update program may not be received in the order conforming to the arrangement in the memory. A peer-to-peer method of transmission of a program after dividing the program into multiple fragments is known; however, in such a case, it is normal that the order for receiving the divided fragments is changed.

In the present embodiment, it is possible that the system program writes the update program in an arbitrary order to the program memory block 11a by issuing the writing permission request and the verification request individually. Further, it is possible to simplify the hardware of the verification function, and at the same time, increase flexibility of the update program transmission by issuing the verification request after all portions of the update program is obtained.

As described above, in the information processing apparatus 1 according to the present embodiment, when the rewriting permission request is issued and the verification state flag 12a is the second value ("verified"), the verification state flag 12a is changed to the first value ("unverified") and the rewriting control flag 31a is changed from the third value ("prohibited") to the fourth value ("permitted") according to changes in the verification state flag 12a. In addition, when the verification request is issued or when the verification of the program 11a1 is necessary because the verification state flag 12a is the first value ("unverified"), the rewriting control flag 31a is changed to the third value ("prohibited") and the verification is performed for the program 11a1 according to the change of the rewriting control flag 31a. Then, the verification state flag 12a is set to the second value ("verified") when the verification is successful, and is maintained as the first value ("unverified") when the verification fails. As a result, when the verification state flag 12a is the second value ("verified") and it is possible to expect that the rewriting will not be performed with respect to the first non-volatile memory region 11, it is possible to skip execution of the secure boot. As a result, it is possible to suppress the execution frequency of the secure boot to the minimum level (when the verification state flag 12a is set to "unverified"). Accordingly, it is possible to reliably detect and prevent unauthorized modification of the program 11a1 and it is possible to shorten the average start-up time of the program 11a1. In addition, it is possible to reduce the average power consumption of the information processing apparatus 1.

Here, in the embodiment described above, it may be difficult to directly estimate the success or failure of the verification from the values of the verification state flag 12a and the rewriting control flag 31a. Therefore, it may be possible to determine whether the verification is successful or failed by providing an additional non-volatile verification success/failure flag and referencing the verification success/failure flag.

In the embodiment described above, prohibition of the rewriting is controlled using the rewriting control flag 31a. When this control is achieved by a logic circuit, the rewriting is prohibited by providing a circuit where the writing control signal is not valid for the memory in a rewrite prohibited state. In addition, when a high voltage which is different from the logic circuit is necessary in data erasing and writing, as in a flash memory, it is possible to more strictly ensure to prohibit the rewriting by stopping the power voltage supply thereof.

In addition, as described above, the verification state flag 12a and rewriting control flag 31a are manipulated safely with respect to interruptions such as power shutdowns; however, this does not apply to bit-reversals due to noise. These flags may be made redundant by using error correction or majority logic.

In the embodiment described above, when the verification fails, the process is stopped. Instead, it is also possible to execute the unverified program 11a1 in a condition where access to the encryption key and important input and output is prohibited. When a verification failure occurs due to memory failure or the like other than a malware program, it is possible to expect that the cause will be recorded and notified, or the like.

In addition, in order to prevent a rewriting conflict of the verification state flag 12a between the rewriting permission circuit 121 and the program verification circuit 141, it is possible for the CPU core 102 or the like to perform a suitable write permission acquirement management.

Figure 13:
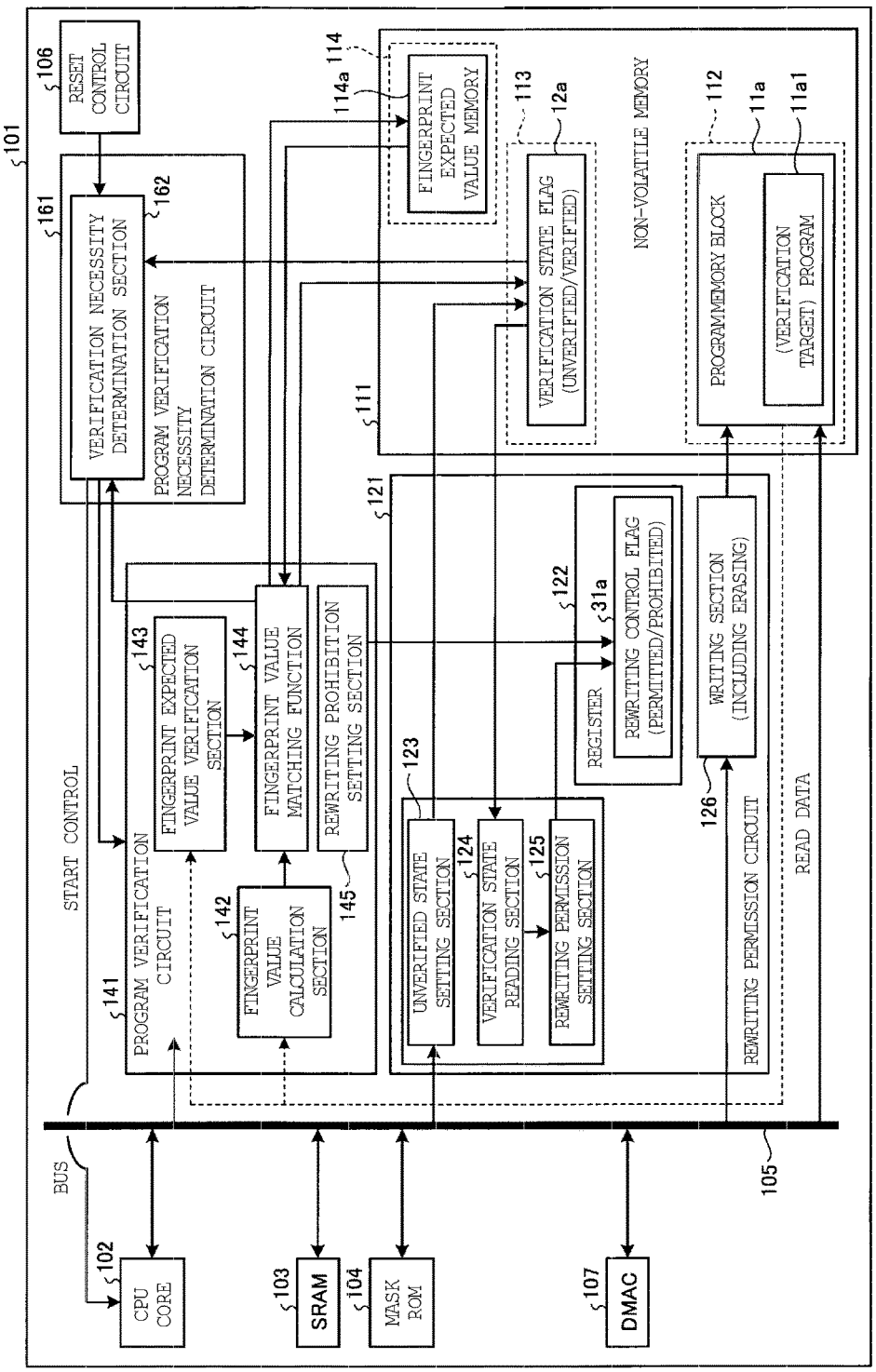
FIG. 13 is a block diagram which illustrates the hardware configuration of the information processing apparatus according to a first modification example of the embodiment.

FIG. 13 is a block diagram which illustrates a hardware configuration of the information processing apparatus 1 (microcontroller chip 101) according to a first modification example of the above embodiment. As shown in FIG. 13, the fingerprint expected value acquired by the program verification circuit 141 may be stored in a non-volatile manner in a logic block (third non-volatile memory region) 114.

The difference with the above-described embodiment in terms of configuration is that the fingerprint expected value memory 114a is provided in the logic block 114. During the verification of the initial program 11a1 or in a setting procedure of the fingerprint expected value, which is provided separately, the verified expected value is written to the fingerprint expected value memory 114a.

Figure 14:
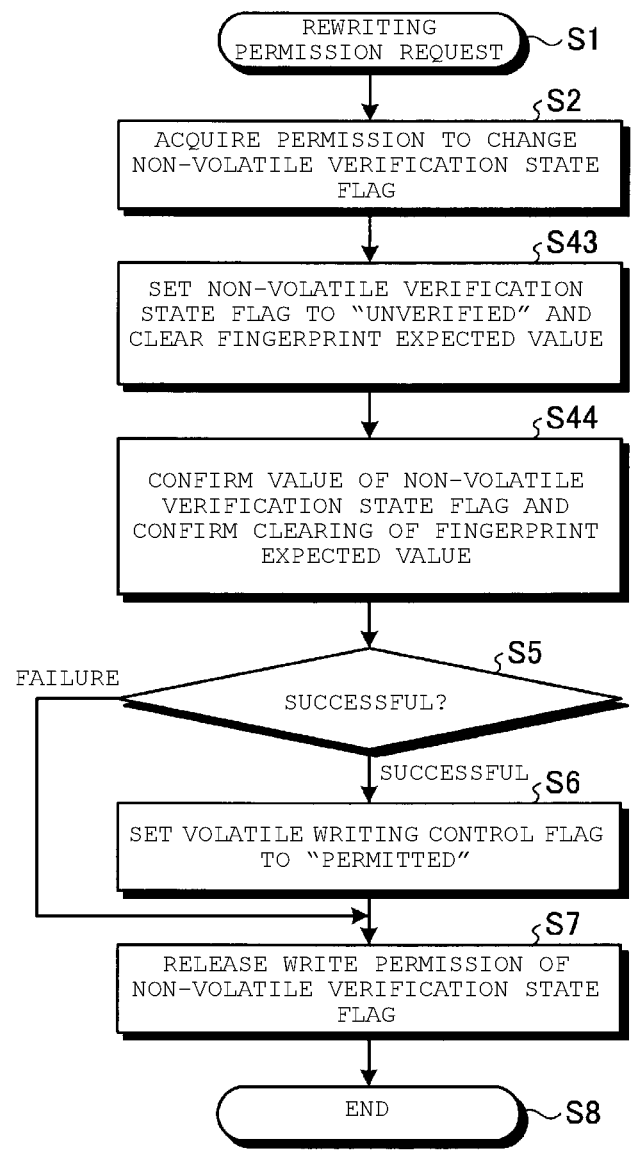
FIG. 14 is a flow chart which illustrates operations carried out by the information processing apparatus according to the first modification example of the embodiment, in accordance with a rewriting permission request.
Figure 15:
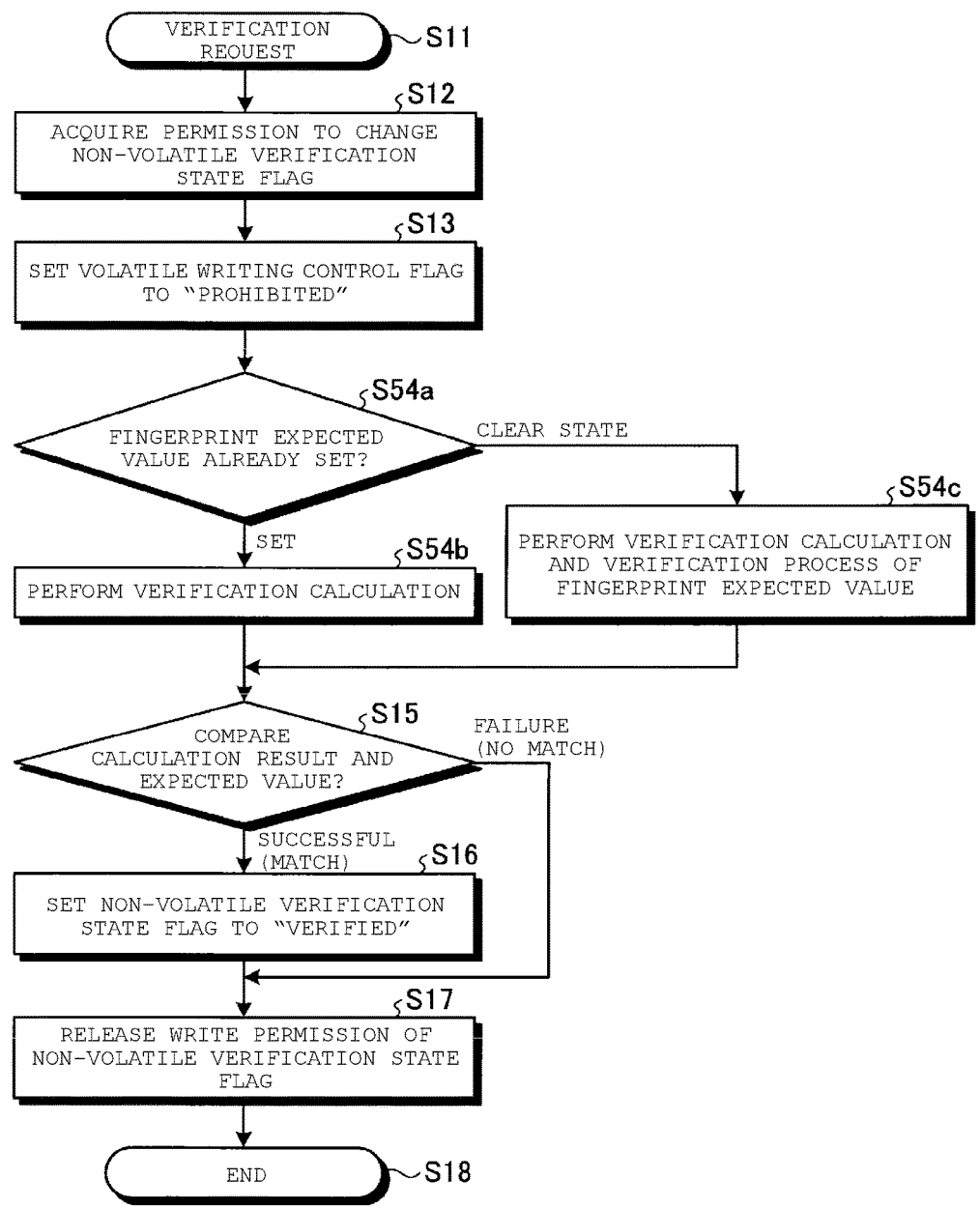
FIG. 15 is a flow chart which illustrates operations carried out by the information processing apparatus according to the first modification example of the embodiment, in accordance with a verification request.

For example, as shown in FIG. 14, in the process in accordance with the rewriting permission request, the fingerprint expected value memory 114a is cleared (S43) when "unverified" is set in the verification state flag 12a. Then, it is confirmed whether the fingerprint expected value is appropriately cleared (S44) when the value of the verification state flag 12a is read for confirmation. In addition, as shown in FIG. 15, during the process in accordance with the verification request, after "prohibited" is set in the rewriting control flag 31a (S13), the program verification circuit 141 refers to the fingerprint expected value memory 114a. If the fingerprint expected value is cleared ("clear state" in S54a), the program verification circuit 141 performs each of calculation of the fingerprint value and acquisition of the fingerprint expected value and then compares both values with each other (S54c). When the fingerprint expected value is stored in the fingerprint expected value memory 114a ("set" in S54a), the program verification circuit 141 skips the acquisition of the fingerprint expected value, calculates the fingerprint value, and then compares the two values with each other (S54b). That is, when the fingerprint expected value has been already set, it is possible to shorten the time for the verification process of the program 11a1.

The fingerprint expected value in the embodiment described above is given as a signature made based on a secret key for anti-counterfeiting by a third party or in the form of MAC. A hash value which is not based on the secret key is not applicable to the embodiment described above because such a hash value can be counterfeited by a third party.

In the first modification example, since the fingerprint expected value is held in the non-volatile memory 111 which is protected from access by a general program, it is also possible to set the fingerprint expected value as a hash value. In such a case, the fingerprint expected value verification section 143 can receive the hash value via an authenticated channel in communication with a program executed by the CPU core 102 or from outside the apparatus, and write to the fingerprint expected value memory 114a. For example, the first modification example is suitable when a secure boot based on the design of Trusted Computing Group (TCG) is carried out, because comparison with a hash value stored in a safe storage is carried out.

In addition, in the point that it is possible to omit the verification process which extends the response start-up time and increases the power consumption in the secure boot, the embodiment described above is particularly suitable for wireless sensors, wireless cards, or the like. Wireless sensors typically operate intermittently, but the secure boot which consumes a large amount of power increases the frequency of battery replacement in the battery-driven terminal. In a wireless card or the like that operate with wirelessly-generated power, the start-up time is further increased since it is not possible to supply a large amount of electric power.

Although these terminals are required to be manufactured at low cost, in, configurations of the information processing apparatus according to the above embodiment and the first modification example are based on hardware. When achieved by hardware, the increase in the chip area leads to an increase in manufacturing cost. In particular, since the secure boot function is less frequently used in comparison with a sensor signal process or the like, performing the secure boot function using general CPU software is advantageous in reduction of the chip area. Although these functions need a long processing period even with the software configuration, these functions can be achieved using the software. However, considering the malware program entering the terminal, the rewriting permission function, the program verification function, and the program verification necessity determination function at the time of start-up should not be subjected to interference from the malware program.

Below, as a second modification example of the above embodiment, a procedure of carrying out the verification and the verification necessity determination at the time of start-up using software will be descried. According to the second modification example, even if a malware program enters the terminal, the influence thereof is eliminated and these functions can be executed safely.

Figure 16:
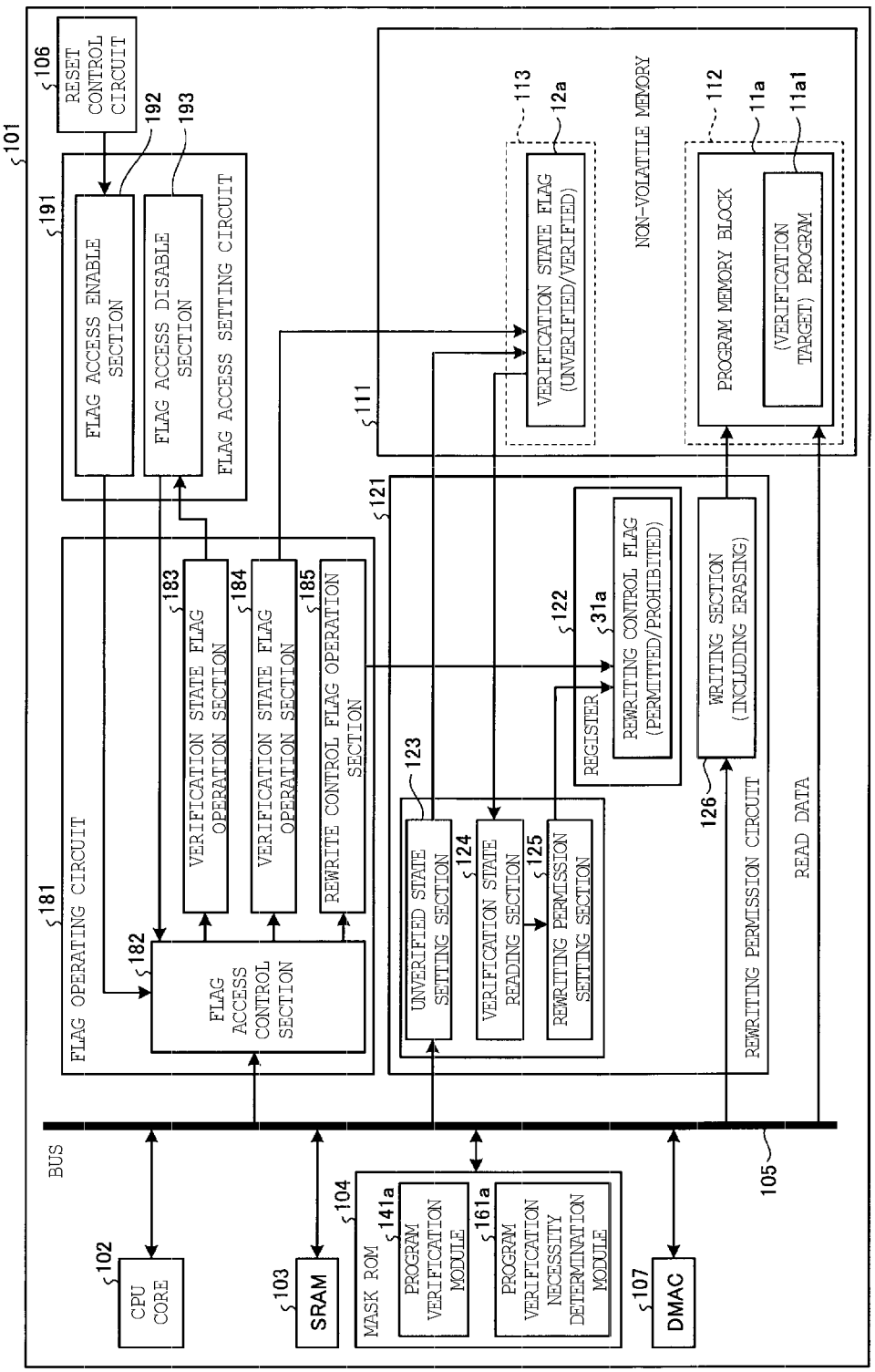
FIG. 16 is a block diagram which illustrates the hardware configuration of the information processing apparatus according to a second modification example of the embodiment.

In the second modification example, the program verification and the program verification necessity determination performed by hardware in the above embodiment are carried out by a program verification module 141a and a verification necessity determination module 161a, respectively, which are function modules stored in the non-rewritable mask ROM 104. FIG. 16 is a block diagram which illustrates a hardware configuration of the information processing apparatus 1 according to the second modification example. The program verification module 141a and the verification necessity determination module 161a are stored in advance in the mask ROM 104. At this time, the flags are directly operated according to the instructions issued by the CPU core 102. For this reason, a flag operation circuit 181 responsible for the flag operation function is provided. In order to prevent use of the flag operation function by a malware program, the period for which the flag operations are possible according to the issued instructions is limited to the period from the restart process of the CPU core 102 until the function modules in the mask ROM 104 are disabled from accessing the flags after executing the function modules in the mask ROM 104. For this reason, a flag access setting circuit 191 for the flag access enable/disable function is provided. The program in the mask ROM 104 can be executed without verification, and the verification may be omitted since this is non-modifiable due to being hardware.

The flag operation circuit 181 has a flag access control section 182, a verification state flag operation section 183, a verification state flag operation section 184, and a rewriting control flag operation section 185. The flag access setting circuit 191 has a flag access enable section 192 and a flag access disable section 193.

These sections only control the rewriting control flag 31a and the verification state flag 12a and the interface and access permission with respect to these flags, and can be achieved by a very small circuit in comparison with the hardware which executes the verification.

Cryptographic calculations such as the hash value or signature by a general CPU generally take a longer time in comparison with dedicated hardware, and the power consumption efficiency is also poorer. However, since the verification process of the secure boot in the second modification example is not carried out as long as the program memory block 11a is not rewritable, there is little influence on the power efficiency in normal use.

Figure 17:
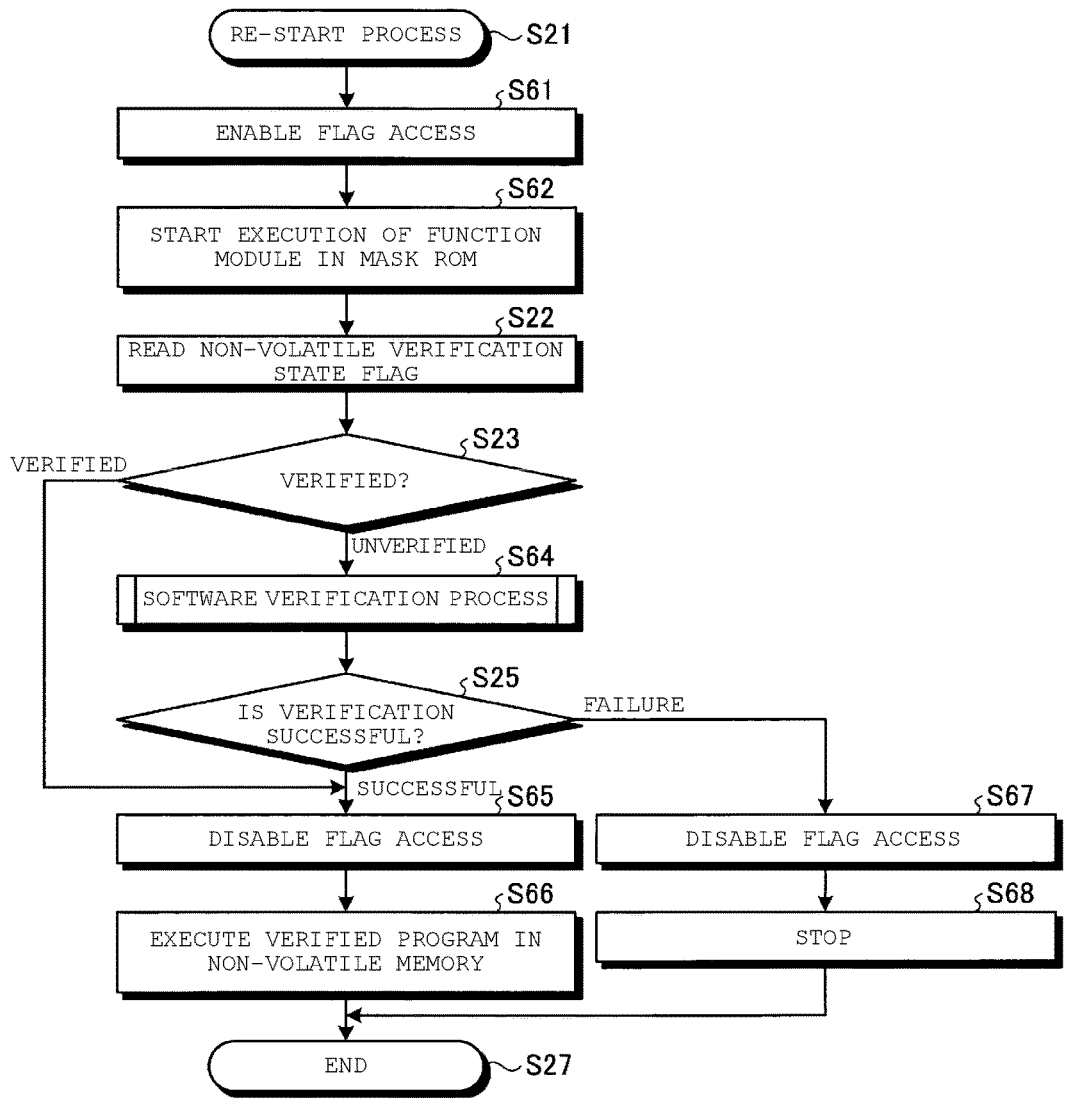
FIG. 17 is a flow chart which illustrates operations for a restarting process that is carried out by the information processing apparatus according to the second modification example of the embodiment.

FIG. 17 is a flowchart which illustrates the operation of the information processing apparatus 1 in accordance with the restarting process in the second modified example. After the restarting process (S21), in a state where flag access is enabled by the flag access setting circuit 191, that is, the flag operation function by the flag operation circuit 181 is enabled (S61), the program verification module 141a and the program verification necessity determination module 161a in the mask ROM 104 are executed (S62). The same function modules read out the verification state flag 12a through the flag operation circuit 181 (S22). When "verified" ("verified" in S23), flag access is disabled (S65), and then the verified program 11a1 is executed (S66). When "unverified" ("unverified" in S23), the verification process of the program memory block 11a is performed (S64) by software. When the verification is successful ("success" in S25), the flag access is also disabled (S65), and then the verified program 11a1 is executed (S66). When the verification fails ("failure" in S25), the flag access is disabled (S67), and the start-up of the program 11a1 is stopped (S68).

In addition, there is known a technique called functional safety which reduces a possible risk of damaging human life and property by machines or the operation of an apparatus. Software is widely used to reduce such a risk when the constituent elements of complicated systems are impaired. In functional safety, it is very important that the software is correct because of its nature. The secure boot can serve as a means for protecting the correctness of the software which is the foundation of the functional safety from malicious attacks. When there is a unintended activation due to the failure of a secure boot mechanism, in particular, when the necessity determination of the secure boot unintended activations, a malicious program may be executed. Accordingly, for the secure boot skip mechanism, it is desirable to eliminate this risk in advance by a technique for detecting failures generally used in functional safety.

Specifically, in the present embodiment, since the verification state flag may be set to a rewriteable state even though not being verified. To avoid such as situation, the prohibited state of the rewriting control flag is ensured using a Built In Self Test (BIST) function for confirming that the writing prohibition of the program memory block is correctly reflected. Here, it is known that data writing and reading with respect to a flash memory used for storing the verification state flag may become unstable, when the writing and reading is repeated. According to the present embodiment, the value once written to the verification state flag is read out, and the correctness thereof is verified or copied to the rewriting control flag. Therefore, even when the writing fails due to deterioration of the flash memory, since the value of the rewriting control flag does not become a writeable state, the mechanism itself according to the present embodiment can provide a portion of the necessary function in the functional safety.

In addition, in the embodiments described above, the verification target is one program; however, a plurality of programs may be the verification target by providing the rewriting control flag and the verification state flag for each program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus, comprising:
a processor;
a rewritable nonvolatile memory that stores a first flag settable to a first value indicating that a program stored in a first memory region of the nonvolatile memory has not been verified, and to a second value indicating that the program has been verified, the first memory region of the nonvolatile memory being an execute-in-place (XIP) region;
a switching circuit comprising a control register that stores a second flag settable either to a third value indicating that data writing to the first memory region is prohibited or to a fourth value indicating that the data writing to the first memory region is allowed, and configured to, upon receipt of a request for permission to set the first memory region from non-writable to writable, set the first flag to the first value, and thereafter set the second flag from the third value to the fourth value; and
a verification circuit configured to
set the second flag to the third value before the start of a verification process of the program stored in the first memory region, and set the first flag to the second value after the verification process finished successfully, and
upon restart of the information processing apparatus, carry out the verification process of the program prior to execution of the program if the first value is set in the first flag, and execute the program without carrying out the verification process if the second value is set in the first flag,
wherein the information processing apparatus is a microcontroller implemented as a single chip or a single package that includes the processor, the rewritable nonvolatile memory, the switching circuit, and the verification circuit.

2. The information processing apparatus according to claim 1, wherein
the first flag is stored in a second memory region of the nonvolatile memory that is different from the first memory region of the nonvolatile memory.

3. The information processing apparatus according to claim 1, wherein the first memory region is non-writable when the third value is set in the second flag, and the first memory region is writable when the fourth value is set in the second flag.

4. The information processing apparatus according to claim 1, wherein
the program is executable when the verification process is successful, and not executable when the verification process fails.

5. The information processing apparatus according to claim 1, wherein
during the verification process, the verification circuit calculates a hash value of the program stored in the first memory region, extracts a hash value from a public key signature of the program, and compares the hash values.

6. The information processing apparatus according to claim 1, wherein
a hash value extracted from a public key signature of the program is stored in another memory region of the nonvolatile memory, and
during the verification process, the verification circuit calculates a hash value of the program stored in the first memory region, and compares the stored hash value and the calculated hash value.

7. The information processing apparatus according to claim 1, wherein
the verification circuit is configured to carry out the verification process in response to a verification request from the processor.

8. The information processing apparatus according to claim 1, further comprising:
a non-rewritable nonvolatile memory that stores a verification program, wherein
the verification circuit carries out the verification process in accordance with the verification program.

9. The information processing apparatus according to claim 1, further comprising:
a network interface, wherein
the processor stores the program downloaded through the network interface onto the rewritable nonvolatile memory before the program is verified.

10. The information processing apparatus according to claim 1, wherein
the processor stores the program onto the rewritable nonvolatile memory while performing the download.

11. A method for operating an information processing apparatus including a processor, a rewritable nonvolatile memory that stores a first flag settable to a first value indicating that a program stored in a first memory region of the nonvolatile memory has not been verified, and to a second value indicating that the program has been verified, the first memory region of the nonvolatile memory being an XIP region, and a switching circuit comprising a control register that stores a second flag settable either to a third value indicating that data writing to the first memory region is prohibited or to a fourth value indicating that the data writing to the first memory region is allowed, the method comprising:
upon receipt of a request for permission to set the first memory region from non-writable to writable, setting, by the switching circuit, the first flag to the first value, and thereafter set the second flag from the third value to the fourth value;
before the start of a verification process of the program stored in the first memory region, setting, by a verification circuit, the second flag to the third value;
upon restart of the information processing apparatus, carrying out, by the verification circuit, the verification process of the program prior to execution of the program if the first value is set in the first flag, and executing the program without carrying out the verification process if the second value is set in the first flag; and
after the verification process finished successfully, setting, by the verification circuit, the first flag to the second value,
wherein the information processing apparatus is a microcontroller implemented as a single chip or a single package that includes the processor, the rewritable nonvolatile memory, the switching circuit, and the verification circuit.

12. The method according to claim 11, wherein
the first flag is stored in a second memory region of the nonvolatile memory that is different from the first memory region of the nonvolatile memory.

13. The method according to claim 11, wherein
the first memory region is non-writable when the third value is set in the second flag, and the first memory region is writable when the fourth value is set in the second flag.

14. The method according to claim 11, wherein
the program is executable when the verification process is successful, and not executable when the verification process fails.

15. The method according to claim 11, wherein the verification process comprises:
calculating a hash value of the program stored in the first memory region;
extracting a hash value from a public key signature of the program; and
comparing the hash values.

16. The method according to claim 11, wherein
a hash value extracted from a public key signature of the program is stored in another memory region of the nonvolatile memory, and
the verification process comprising:
calculating a hash value of the program stored in the first memory region; and
comparing the stored hash value and the calculated hash value.

17. The method according to claim 11, further comprising:
issuing a verification request from the processor, wherein
the verification process is carried out in response to the verification request by the verification circuit that is provided separately from the processing unit.

18. The method according to claim 11, wherein
the information processing apparatus further includes a non-rewritable nonvolatile memory that stores a verification program, and
the verification process is carried out in accordance with the verification program.

* * * * *